US012597980B2

(12) United States Patent
    Jia et al.

(10) Patent No.:    US 12,597,980 B2
(45) Date of Patent:        Apr. 7, 2026

(54) METHOD AND APPARATUS FOR DETECTING BEAM FAILURE

(71) Applicant: 1FINITY Inc., Kawasaki (JP)

(72) Inventors: Meiyi Jia, Beijing (CN); Xin Wang, Beijing (CN); Yang Lu, Beijing (CN); Su Yi, Beijing (CN)

(73) Assignee: 1FINITY Inc., Kawasaki (JP)

( * ) Notice: Subject to any disclaimer, the term of this patent is extended or adjusted under 35 U.S.C. 154(b) by 0 days.

(21) Appl. No.: 18/218,700

(22) Filed: Jul. 6, 2023

(65) Prior Publication Data

US 2023/0353223 A1      Nov. 2, 2023

Related U.S. Application Data

(63) Continuation of application No. PCT/CN2021/071617, filed on Jan. 13, 2021.

(51) Int. Cl.
    *H04B 7/06*                (2006.01)
(52) U.S. Cl.
    CPC ..... *H04B 7/06964* (2023.05); *H04B 7/06954* (2023.05)
(58) Field of Classification Search
    CPC ........................ H04B 7/06964; H04B 7/06954
    USPC ....................................................... 375/262
    See application file for complete search history.

(56)                References Cited

U.S. PATENT DOCUMENTS

| | | | |
|---|---|---|---|
| 2020/0350972 A1 | 11/2020 | Yi et al. | |
| 2021/0351834 A1 | 11/2021 | Yang et al. | |
| 2022/0104036 A1* | 3/2022 | Zhou ..................... | H04W 24/04 |

FOREIGN PATENT DOCUMENTS

| | | |
|---|---|---|
| CN | 110708714 A | 1/2020 |
| CN | 110896546 A | 3/2020 |
| CN | 111278122 A | 6/2020 |
| WO | WO-2022141303 A1 * | 7/2022 |

OTHER PUBLICATIONS

Notification of Reasons for Refusal issued by the Japan Patent Office for corresponding Japanese Patent Application No. 2023-541095, mailed on May 21, 2024, with an English translation.
3GPP TS 38.321 V16.3.0, "3rd Generation Partnership Project; Technical Specification Group Radio Access Network; NR; Medium Access Control (MAC) protocol specification (Release 16)" Dec. 2020.

(Continued)

*Primary Examiner* — Leila Malek
(74) *Attorney, Agent, or Firm* — Myers Wolin, LLC

(57)                ABSTRACT

A method and an apparatus for detecting beam failure. The method comprises: receiving a beam failure instance indication by a medium access control (MAC) entity of a terminal equipment, incrementing a transmission reception point (TRP)-specific beam failure indication count by 1, and in a case where the TRP-specific beam failure indication count is greater than or equal to a TRP-specific beam failure instance maximum count, determining that a beam failure occurs in a transmission reception point or beam failure recovery (BFR) of the transmission reception point is triggered or a beam failure indication of the transmission reception point is triggered.

18 Claims, 12 Drawing Sheets

501 a MAC entity of a terminal equipment receives a beam failure instance indication

502 a TRP-specific beam failure indication count is incremented by 1

503 in a case where the TRP-specific beam failure indication count is greater than or equal to a TRP-specific beam failure instance maximum count, determines that a beam failure occurs at the TRP

(56)                References Cited

OTHER PUBLICATIONS

Samsung, "Summary of proposed corrections (AI 6.16.3)", Agenda Item: 6.16.3, 3GPP TSG-RAN2 Meeting #109bis Electronic, R2-2003795, Apr. 20-24, 2020.

The Extended European search report with the Supplementary European search report and the European search opinion, issued by the European Patent Office for corresponding European Patent Application No. 21918324.1, mailed on Feb. 15, 2024.

Vivo, "Further discussion on MTRP multibeam enhancement", Agenda Item: 8.1.2.3, 3GPP TSG-RAN WG1 #103-e, R1-2007647, e-Meeting; Oct. 26-Nov. 13, 2020.

Samsung, "Enhancements on beam management for multi-TRP", Agenda Item: 8.1.2.3, 3GPP TSG-RAN WG1 #103, R1-2008151, e-Meeting; Oct. 26-Nov. 13, 2020.

International Search Report and Written Opinion of the International Searching Authority issued by the China National Intellectual Property Administration for corresponding International Patent Application No. PCT/CN2021/071617, mailed on Sep. 28, 2021, with an English translation.

Qualcomm Incorporated, "Enhancements on beam management for multi-TRP", Agenda Item: 8.1.2.3, 3GPP TSG-RAN WG1 Meeting #103-e, R1-2009253, Online, Oct. 26-Nov. 13, 2020.

The First Examination Report issued by the Patent Office of India for corresponding Indian Patent Application No. 202337044930, mailed on Mar. 6, 2024, with English translation.

Notice of Preliminary Rejection issued by the Korean Intellectual Property Office for corresponding Korean Patent Application No. 10-2023-7022443, mailed on Aug. 27, 2025, with an English translation.

Qualcomm Inc. et al., "Correction on BFR MAC CE generation", Work item code: NR_eMIMO-Core, 3GPP TSG-RAN WG2 Meeting #111 electronic, R2-2008219, Change Request, Online, Aug. 17-28, 2020, cited in CNOA.

First Notification of Office Action and Search Report issued by the China National Intellectual Property Administration for corresponding Chinese Patent Application No. 202180083538.1, mailed on Feb. 26, 2026, with an English translation.

* cited by examiner

100

101

102

| $C_7$ | $C_6$ | $C_5$ | $C_4$ | $C_3$ | $C_2$ | $C_1$ | SP |
|---|---|---|---|---|---|---|---|
| AC | R | Candidate RS ID or R bit | | | | | |

...

| AC | R | Candidate RS ID or R bit |
|---|---|---|

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bit | | | | | |

...

| AC | R | Candidate RS ID or R bit |
|---|---|---|

501 a MAC entity of a terminal equipment receives a beam failure instance indication

502 a TRP-specific beam failure indication count is incremented by 1

503 in a case where the TRP-specific beam failure indication count is greater than or equal to a TRP-specific beam failure instance maximum count, determines that a beam failure occurs at the TRP

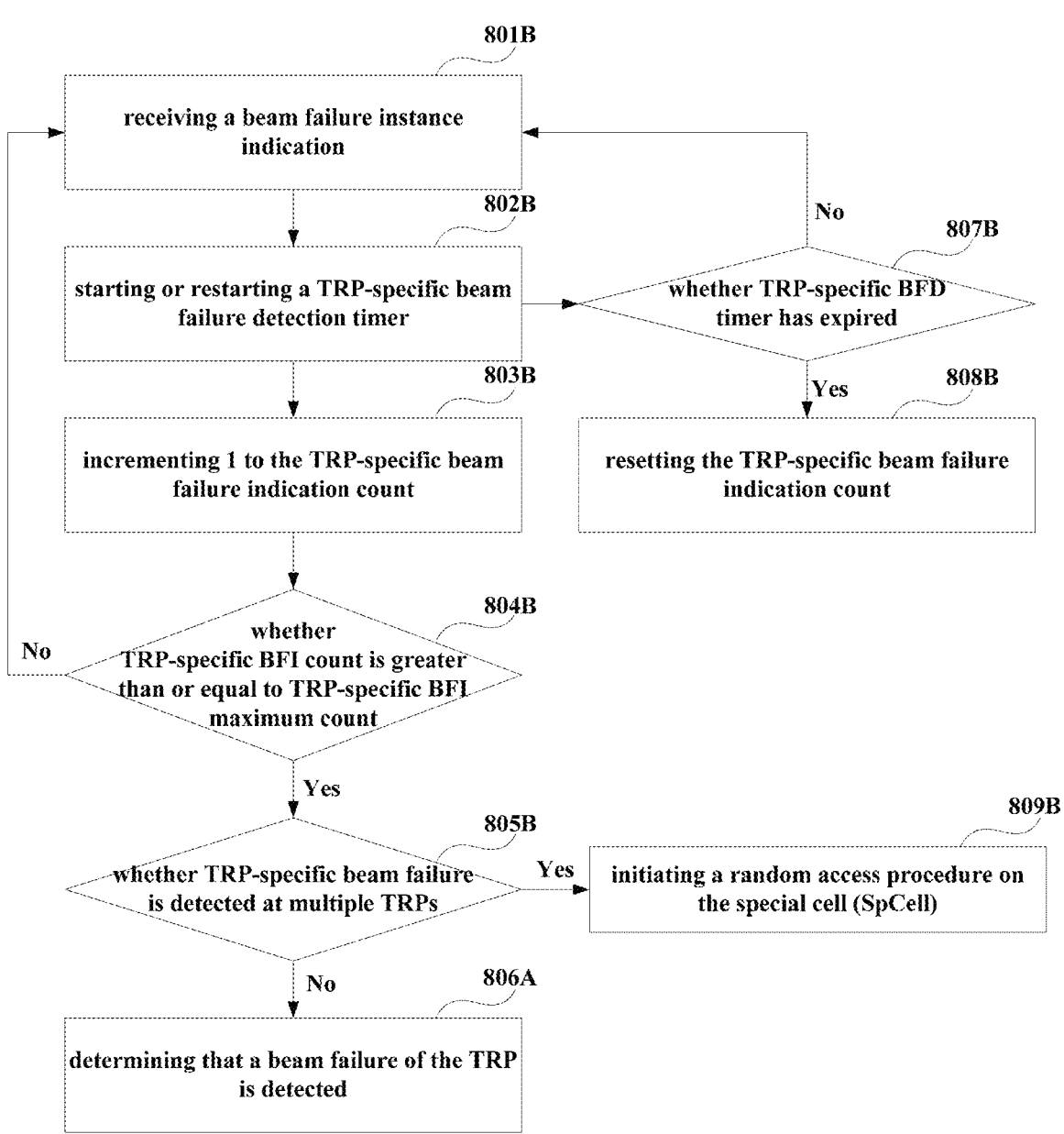

801B receiving a beam failure instance indication

802B starting or restarting a TRP-specific beam failure detection timer

807B whether TRP-specific BFD timer has expired

No

803B incrementing 1 to the TRP-specific beam failure indication count

808B

Yes resetting the TRP-specific beam failure indication count

804B whether TRP-specific BFI count is greater than or equal to TRP-specific BFI maximum count No Yes

805B whether TRP-specific beam failure is detected at multiple TRPs

809B

Yes initiating a random access procedure on the special cell (SpCell)

806A

No determining that a beam failure of the TRP is detected

Fig. 8B

METHOD AND APPARATUS FOR DETECTING BEAM FAILURE

CROSS-REFERENCE TO RELATED APPLICATION

This application s a continuation application of International Application PCT/CN2021/071617 filed on Jan. 13, 2021, and designated the U.S., the entire contents of which are incorporated herein by reference.

TECHNICAL FIELD

Embodiments of the present application relate to the field of communication technology.

BACKGROUND

In a new new radio (NR) system, transmission and reception of beams are supported, and management of multiple beams is supported. A terminal equipment may perform a beam failure detection (BFD) procedure and a beam failure recovery (BFR) procedure.

In 3GPP Rel-15/16, a medium access control (MAC) entity may be configured by radio resource control (RRC) per serving cell with a beam failure recovery procedure. When beam failure is detected on serving synchronization signal block(s) (SSB(s))/channel state information reference signals (CSI-RS(s)), a new SSB or CSI-RS is indicated to a serving network device (e.g., gNB).

When a MAC protocol data unit (PDU) is transmitted by the terminal equipment to the network device, and the MAC PDU includes a BFR MAC control element (CE) or a truncated BFR MAC CE which contains beam failure information of a secondary cell, the terminal equipment shall cancel all BFRs triggered for beam failure recovery in the secondary cell before the MAC PDU assembly.

In the beam failure recovery procedure, the MAC entity will execute the following operation:

If the beam failure recovery procedure determines that at least one BFR has been triggered and not cancelled, an evaluation of its candidate beams has been completed according to the requirements:

If uplink resources (UL-SCH resources) are available for a new transmission and if the uplink resources can accommodate a BFR MAC CE plus its sub-header as a result of logical channel prioritization (LCP), then a multiplexing and assembly procedure is instructed to generate the BFR MAC CE;

If the uplink resources are available for a new transmission and if the uplink resource can accommodate a truncated BFR MAC CE plus its sub-header as a result of logical channel prioritization (LCP), then the multiplexing and assembly procedure is instructed to generate the truncated BFR MAC CE;

Otherwise, a scheduling request (SR) is triggered for each secondary cell for which the BFR has been triggered and not cancelled, and for which the evaluation of its candidate beams has been completed according to the requirements.

Therefore, the beam failure information of the secondary cell may be carried by the BFR MAC CE or the truncated BFR MAC CE and transmitted by the terminal equipment to the network device.

It should be noted that, the above introduction to the background is merely for the convenience of clear and complete description of the technical solution of the present application, and for the convenience of understanding of persons skilled in the art. It cannot be regarded that the above technical solution is commonly known to persons skilled in the art just because that the solution has been set forth in the backgroud of the present application.

SUMMARY

However, the inventor has found that in multiple transmission reception points (TRP) operation, if only part of the beams fails, the terminal equipment may not trigger beam failure detection; in addition, if the beam failure detection is not distinguished between a cell level or a TRP level, resources may be wasted.

To address at least one of the above problems, embodiments of the present application provide a method and an apparatus for detecting beam failure.

According to an aspect of the embodiments of the present application, there is provided with an apparatus for detecting beam failure, including:

a receiving unit configured to receive a beam failure instance indication by a medium access control entity;

a counting unit configured to increment a TRP-specific beam failure indication count by 1; and a processing unit configured to, in a case where the TRP-specific beam failure indication count is greater than or equal to a TRP-specific beam failure instance maximum count, determine that a beam failure occurs in a transmission reception point or beam failure recovery (BFR) of the transmission reception point is triggered or a beam failure indication of the transmission reception point is triggered.

According to another aspect of the embodiments of the present application, there is provided with a method for detecting beam failure, including:

receiving a beam failure instance indication by a medium access control (MAC) entity of a terminal equipment;

incrementing a transmission reception point (TRP)-specific beam failure indication count by 1; and in a case where the TRP-specific beam failure indication count is greater than or equal to a TRP-specific beam failure instance maximum count, determining that a beam failure occurs in a transmission reception point or beam failure recovery (BFR) of the transmission reception point is triggered or a beam failure indication of the transmission reception point is triggered.

According to another aspect of the embodiments of the present application, there is provided with a communication system, including:

a terminal equipment, configured to receive a beam failure instance indication by a medium access control (MAC) entity, increment a transmission reception point (TRP)-specific beam failure indication count by 1, and in a case where the TRP-specific beam failure indication count is greater than or equal to a TRP-specific beam failure instance maximum count, determine that a beam failure occurs in a transmission reception point or beam failure recovery (BFR) of the transmission reception point is triggered or a beam failure indication of the transmission reception point is triggered.

One of the advantageous effects of the embodiments of the present application is that, the MAC entity of the terminal equipment receives a beam failure instance indication, increments a transmission reception point (TRP)-specific beam failure indication count by 1, and in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered. Thus, not only beam failure detection at the TRP level can be triggered when only part of the beams fails, but also beam failure detection at the cell level or the TRP level can be distinguished, thereby avoiding resource waste.

With reference to the Description and drawings below, a specific embodiment of the present application is disclosed in detail, which specifies the manner in which the principle of the present application can be adopted. It should be understood that, the scope of the embodiment of the present application is not limited. Within the scope of the spirit and clause of the appended claims, the embodiment of the present application includes many variations, modifications and equivalents.

The features described and/or shown for one embodiment can be used in one or more other embodiments in the same or similar manner, can be combined with the features in other embodiments or replace the features in other embodiments.

It should be emphasized that, the term "include/contain" refers to, when being used in the text, existence of features, parts, steps or assemblies, without exclusion of existence or attachment of one or more other features, parts, steps or assemblies.

BRIEF DESCRIPTION OF DRAWINGS

Elements and features described in one drawing or one embodiment of embodiments of the present application may be combined with elements and features illustrated in one or more other drawings or embodiments. Furthermore, in the drawings, like reference numerals refer to corresponding parts in the several drawings and may be used to indicate corresponding parts used in more than one embodiment.

FIG. 8B is another schematic diagram of a method for detecting beam failure according to an embodiment of the present application;

DESCRIPTION OF EMBODIMENTS

Figures 1, 2, 3:
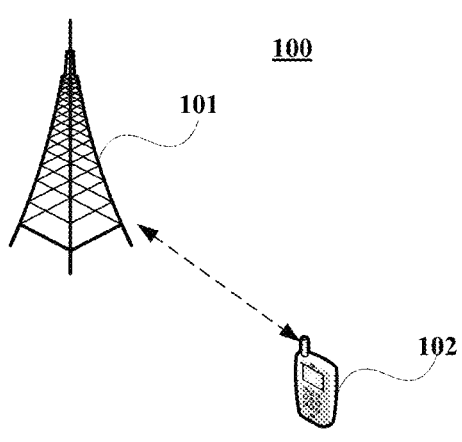
FIG. 1 is a schematic diagram of a communication system according to an embodiment of the present application.
FIG. 2 is a schematic diagram of a BFR MAC CE or a truncated BFR MAC CE in a first format.
FIG. 3 is a schematic diagram of a BFR MAC CE or a truncated BFR MAC CE in a second format.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.), IAB (Integrated Access and Backhaul) node or IAB-DU or IAB-donor. The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. Herein, a "device" may refer to both a network device and a terminal device unless otherwise specified.

Scenarios in the embodiments of this disclosure shall be described below by way of examples; however, this disclosure is not limited thereto.

FIG. 1 is a schematic diagram of a communication system according to an embodiment of the present application, schematically illustrating a case where a terminal device and a network device are taken as examples. As shown in FIG. 1, the communication system 100 may include a network device 101 and a terminal device 102. For the sake of simplicity, FIG. 1 gives illustration by taking only one terminal device and one network device as examples, but the embodiment of the present application is not limited thereto, and there may be a plurality of terminal devices, for example.

In an embodiment of the present application, existing services or services that can be implemented in the future can be transmitted between the network device 101 and the terminal device 102. For example, these traffics may include, but are not limited to, enhanced Mobile Broadband (eMBB), massive Machine Type Communication (mMTC) and Ultra-Reliable and Low-Latency Communication (URLLC), etc.

In the beam failure detection (BFD) procedure of Rel-15/16, the MAC entity of the medium access control (MAC) layer of the terminal equipment detects a beam failure by counting beam failure instance indication from lower layers (e.g. a physical layer) to the MAC entity.

For example, the beam failure detection procedure uses the UE variable BFI_COUNTER, which is a counter for the beam failure instance indication, initially set to 0, with one BFI_COUNTER per serving cell. For each serving cell configured with beam failure detection, the MAC entity will execute the following operation:

If beam failure instance indication has been received from the lower layers, a beam Failure Detection Timer is started or restarted; and the terminal equipment variable BFI_COUNTER is incremented by 1; in a case that BFI_COUNTER is greater than or equal to a beamFailureInstanceMaxCount: if the serving cell is a secondary cell (SCell), one beam failure recovery (BFR) of the serving cell is triggered, otherwise, a random access procedure is initiated on the special cell (SpCell). The BFI_COUNTER is set to 0 if the beamFailureDetectionTimer expires, or if beamFailureDetectionTimer, beamFailureInstanceMaxCount, or any of reference signals for beam failure detection is reconfigured by upper layers associated with this serving cell. In the beam failure recovery procedure, beam failure information of a secondary cell may be carried by a BFR MAC CE or a truncated BFR MAC CE, and transmitted by the terminal equipment to the network device.

FIG. 2 is a schematic diagram of a BFR MAC CE or a truncated BFR MAC CE in a first format (called Format 1). FIG. 3 is a schematic diagram of a BFR MAC CE or a truncated BFR MAC CE in a second format (called Format 2).

In particular, for the BFR MAC CE, for example, if the highest ServCellIndex of the MAC entity's secondary cell for which beam failure is detected and the evaluation of the candidate beams according to the requirement has been completed is less than 8, then Format 1 in FIG. 2 is used; otherwise Format 2 in FIG. 3 is used.

For the truncated BFR MAC CE, if the highest ServCellIndex of the MAC entity's secondary cell for which beam failure is detected and the evaluation of the candidate beams according to the requirement has been completed is less than 8, or the special cell detects a beam failure and this special cell will be included in a truncated BFR MAC CE, and the UL-SCH resource cannot accommodate the Truncated BFR MAC CE of Format 2 in FIG. 3 plus its sub-header as a result of LCP, then Format 1 of FIG. 2 is used; otherwise Format 2 in FIG. 3 is used.

For example, the field definitions for Format 1 and Format 2 are as follows:

For the BFR MAC CE, the Ci field indicates beam failure detection of the secondary cell with ServCellIndex i, whether evaluation of the candidate beam is completed and presence of an octet containing an AC field, the AC field indicates the presence of a Candidate RS ID field in this octet, and the Candidate RS ID field is set to the index of SSB or CSI-RS.

The Ci field set to 1 indicates that beam failure is detected, the evaluation of the candidate beams according to requirements has been completed, and the octet containing the AC field is present for the secondary cell with ServCellIndex i. The Ci field set to 0 indicates that the beam failure is not detected, or the beam failure is detected but the evaluation of the candidate beams according to requirements has not been completed, and the octet containing the AC field is not present for the secondary cell with ServCellIndex i. The octets containing the AC field are present in an ascending order based on ServCellIndex.

For the truncated BFR MAC CE, the Ci field indicates beam failure detection of the secondary cell with ServCellIndex i, whether evaluation of the candidate beam is completed and presence of an octet containing an AC field, the AC field indicates the presence of a Candidate RS ID field in this octet, and the Candidate RS ID field is set to the index of SSB or CSI-RS.

The Ci field set to 1 indicates that beam failure is detected, the evaluation of the candidate beams according to requirements has been completed, and the oct containing the AC field is present for the secondary cell with ServCellIndex i. The Ci field set to 0 indicates that beam failure is not detected, or beam failure is detected but the evaluation of the candidate beams according to requirements has not been completed, and the octet containing the AC field is not present for the secondary cell with ServCellIndex i. If present, the octets containing the AC field are included in ascending order based on ServCellIndex. The number of the octets containing the AC field may be 0, while not exceeding the size of the available grant.

The (Truncated) BFR MAC CE is schematically described above, and the related scenarios of the embodiments of the present application are described below. In the embodiments of the present application, the beam may be replaced by a reference signal (RS), and may be represented by SSB or CSI-RS, for example.

Figure 4:
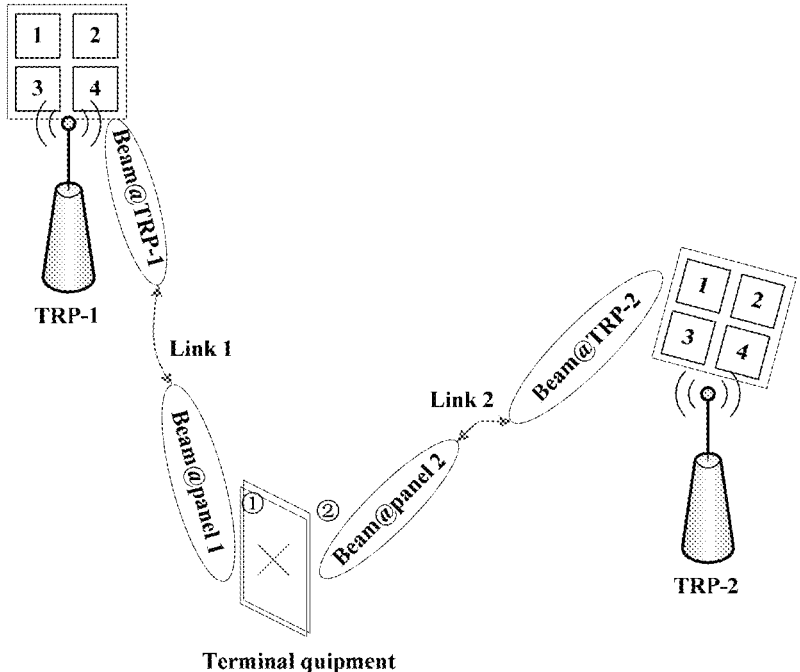
FIG. 4 is a schematic diagram of a multi-TRP scenario according to an embodiment of the present application.

FIG. 4 is a schematic diagram of a multi-TRP scenario according to an embodiment of the present application. The TRP may be part of a network device (e.g., gNB) that receives signals from the terminal equipment, or part of a network device (gNB) that transmits signals to the terminal equipment. In addition, the TRP may also represent a set of downlink control information (DCI) or a set of reference signals, etc.

As shown in FIG. 4, in the scenario of multi-TRP operation, the terminal equipment may have a panel 1 (panel-1) and a panel 2 (panel-2); one serving cell may schedule the terminal equipment from 2 TRPs, provide better physical downlink shared channel (PDSCH) coverage, reliability, and/or data rate.

For the multi-TRP operation, there may be two different modes of operation: single DCI and multiple DCI. For the two modes, control of the uplink and downlink operations is performed by the physical layer and medium access control (MAC). In the single DCI mode, the terminal equipment is scheduled by two TRPs through the same DCI; and in the multi-DCI mode, the terminal equipment is scheduled by a separate DCI of each TRP.

In the multi-TRP operation, according to the mechanism of Rel-15/16 beam failure detection and beam failure recovery, when a beam between a single TRP and the terminal equipment is blocked while a beam between another TRP and the terminal equipment operates, the physical layer does not indicate a beam failure instance to the MAC layer and does not trigger the beam failure detection procedure of the MAC layer. In addition, if the beam failure detection is not distinguished between the cell level and the TRP level, resources may be wasted.

For example, if a failure occurs on only one TRP in a cell, the physical layer indicates a beam failure instance to the MAC layer; the terminal equipment and the network device believe that a cell-level beam failure has occurred, a cell handover procedure may be performed, another TRP on the cell where failure has not occurred is not fully utilized and thus resource utilization is low.

For another example, if a beam failure is detected on one of the TRPs of a special cell, the terminal equipment may not trigger the BFR but may trigger random access (RA). In this case, the random access is unnecessary, resulting in waste of random access resources and longer service interruption.

In response to the above problem, the embodiments of the present application are further described below. The embodiments of the present application are described from the MAC layer of the terminal equipment and implemented by the MAC entity, wherein the MAC entity includes a beam failure detection procedure, a beam failure recovery procedure, and a multiplexing and assembly entity (hereinafter also referred to as a multiplexing and assembly procedure), etc. The lower layers of the embodiments of the present application are, for example, physical layers, antenna units, measurement procedures, etc. For specific concepts and definitions of each layer and each entity, reference may be made to related technologies, and detailed description is omitted in embodiments of the present application.

In the embodiments of the present application, cell-specific may be understood as cell-level or all beam, with cell as granularity, and TRP-specific may be understood as TRP-level or part of the beams, with TRP as granularity. The cell-specific MAC CE may be a BFR MAC CE of Rel-15/Rel-16 or a truncated BFR MAC CE of Rel-15/Rel-16, etc. The term "detected beam failure" may be interchanged with "triggered beam failure recovery" or "triggered beam failure indication".

Embodiments of the First Aspect

An embodiment of the present application provides a method for detecting beam failure, which is described from a terminal equipment.

Figure 5:
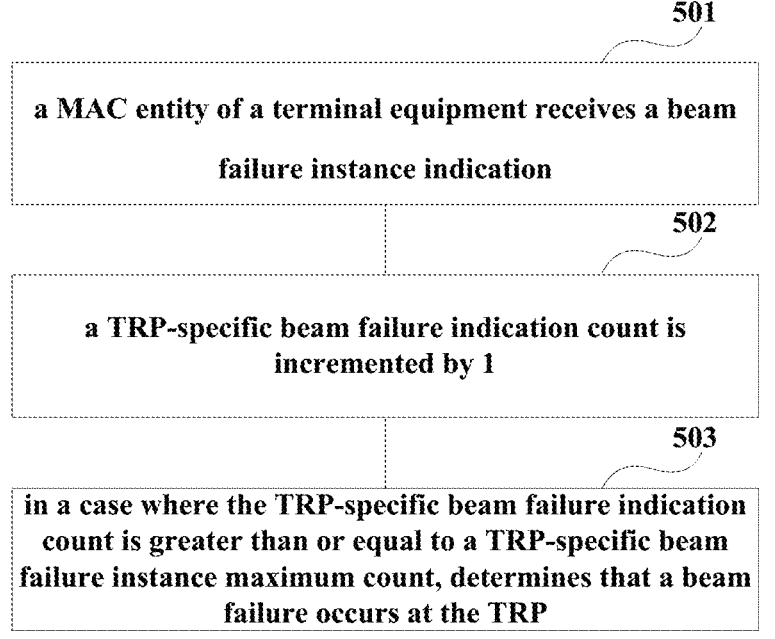
FIG. 5 is a schematic diagram of a method for detecting beam failure according to an embodiment of the present application.

FIG. 5 is a schematic diagram of a method for detecting beam failure according to an embodiment of the present application, as shown in FIG. 5, the method including:

501, a medium access control (MAC) entity of a terminal equipment receives a beam failure instance indication;

502, a transmission reception point (TRP)-specific beam failure indication count is incremented by 1; and

503, in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered.

It should be noted that FIG. 5 only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 5 described above.

Figure 6:
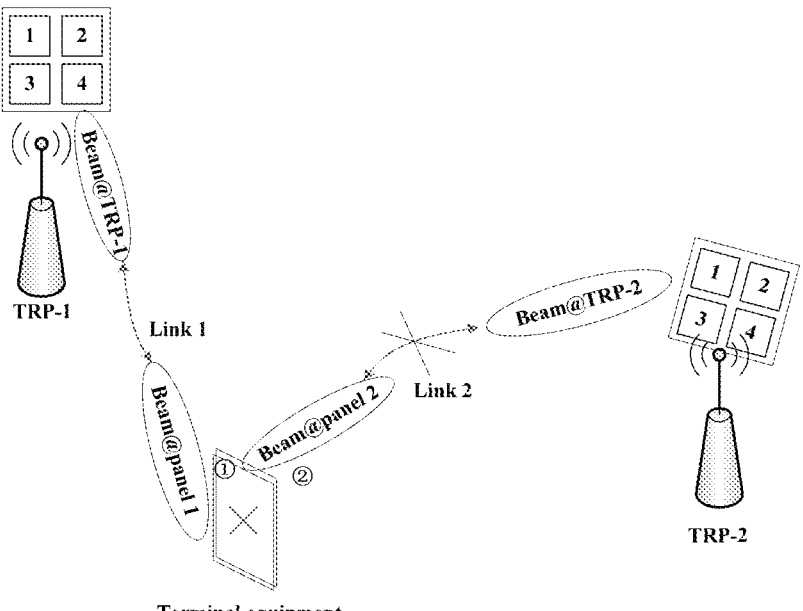
FIG. 6 is a schematic diagram of a BFD or BFR according to an embodiment of the present application.

FIG. 6 is a schematic diagram of beam failure detection (BFD) or beam failure recovery (BFR) according to an embodiment of the present application. As shown in FIG. 6, the network device provides service for the terminal equipment by using TRP-1 and TRP-2. The link 1 (link-1) between the TRP-1 and the terminal equipment operates normally, but the link 2 (link-2) between the TRP-2 and the terminal equipment is blocked.

In embodiments of the present application, the terminal equipment may configure the BFD of the TRP level or trigger the BFR of the TRP level independently of the BFD procedure of the cell level. Thus, not only beam failure detection at the TRP level can be triggered when only part of the beams fails, but also beam failure detection at the cell level or the TRP level can be distinguished, thereby avoiding resource waste.

Figure 7:
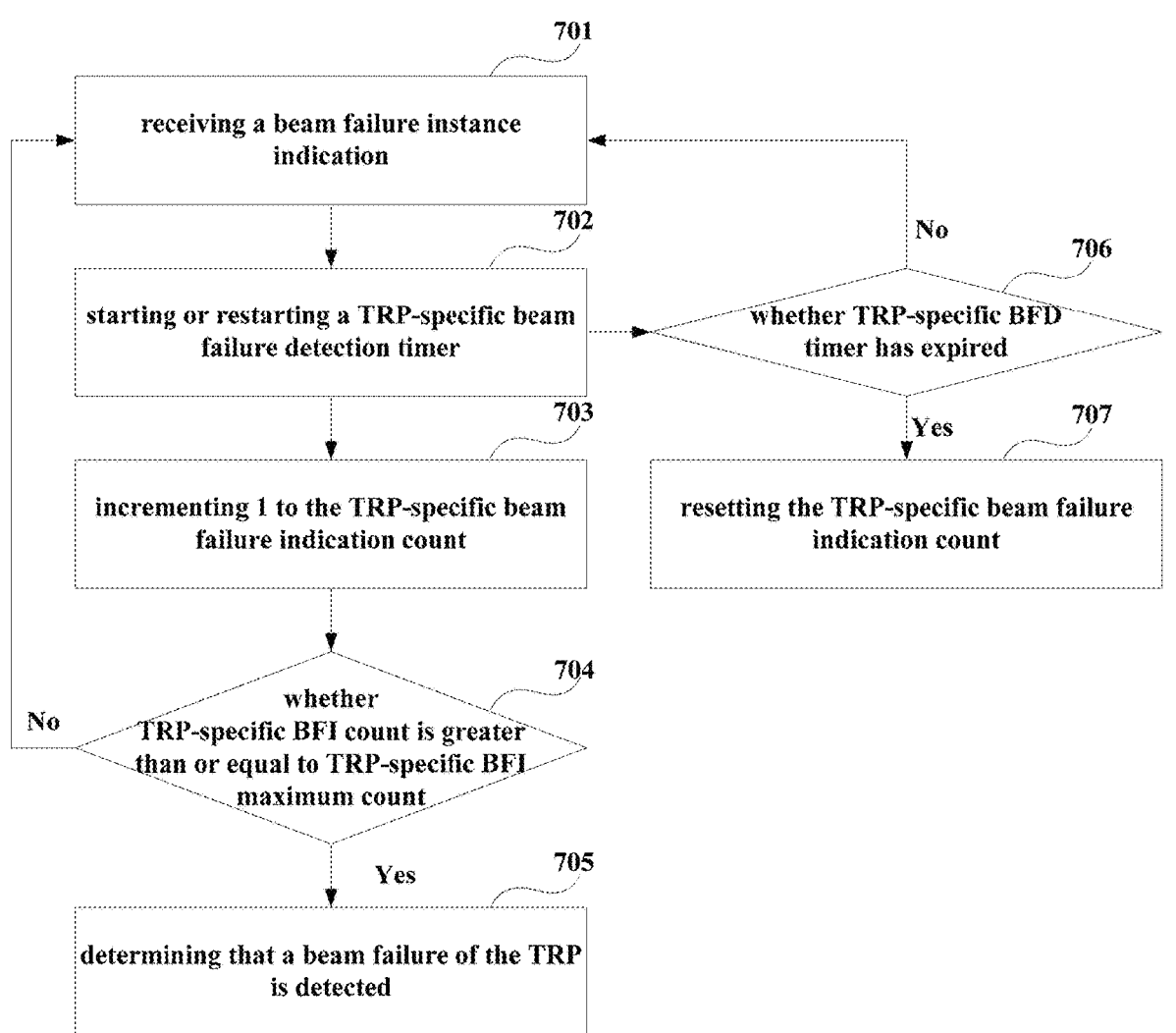
FIG. 7 is another schematic diagram of a method for detecting beam failure according to an embodiment of the present application.

FIG. 7 is another schematic diagram of a method for detecting beam failure according to an embodiment of the present application, schematically illustrating an operation of an MAC entity of a terminal equipment for a TRP configured with beam failure detection. As shown in FIG. 7, the operation of the MAC entity includes:

701, receiving a beam failure instance indication from a lower layer;

702, starting or restarting a transmission reception point (TRP)-specific beam failure detection timer (e.g., beamFailure Detection Timer-per TRP);

703, incrementing 1 to the TRP-specific beam failure indication count (e.g., BFI_COUNTER-per TRP) associated with the TRP-specific beam failure detection timer (e.g., beamFailure Detection Timer-per TRP);

704, determining whether the TRP-specific beam failure indication count (e.g., BFI_COUNTER-perTRP) is greater than or equal to the TRP-specific beam failure instance maximum count (e.g., beamFailureInstanceMaxCount-per TRP); and 705, in a case where the TRP-specific beam failure indication count (e.g., BFI_COUNTER-per TRP) is greater than or equal to the TRP-specific beam failure instance maximum count (e.g., beamFailureInstanceMaxCount-perTRP), determining that a beam failure of the TRP is detected or a beam failure recovery (BFR) of the TRP is triggered or a beam failure indication of the TRP is triggered.

As shown in FIG. 7, the operation of the MAC entity further includes:

706, determining whether the TRP-specific beam failure detection timer (e.g., beamFailureDetectionTimer-per TRP) has expired; and 707, resetting the TRP-specific beam failure indication count (e.g., BFI_COUNTER-perTRP) or setting the TRP-specific beam failure indication count (e.g., BFI-_COUNTER-perTRP) to 0 in the case where the TRP-specific beam failure detection timer has expired.

In some embodiments, the TRP-specific beam failure indication count (e.g., BFI_COUNTER-perTRP) is also reset or set to 0 in one or any combination of the following cases:

deactivation of the secondary cell;

the TRP-specific beam failure detection timer, the TRP-specific beam failure instance maximum count, a reference signal for detecting that a beam failure occurs in a transmission reception point or beam failure recovery (BFR) of the transmission reception point is triggered or a beam failure indication of the transmission reception point is triggered, are reconfigured by the upper layer;

MAC reset;

the TRP on a cell is reconfigured, including a control resource pool associated a control resource is reconfigured, or the TRP index is reconfigured.

It should be noted that FIG. 7 only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 7 described above.

In some embodiments, the MAC entity of the terminal equipment instructs the multiplexing and assembly entity to generate a TRP-specific beam failure recovery MAC CE or a TRP-specific beam failure MAC CE. For the content of generating the MAC CE, reference may also be made to an embodiment of the third aspect described later.

In some embodiments, the MAC entity of the terminal equipment determines whether the evaluation of the candidate beam is completed when the candidate beam is configured.

In some embodiment, if the beam failure recovery procedure determines that at least one beam failure recovery has been triggered and not cancelled, or a beam failure is detected, or at least one beam failure indication is triggered and not cancelled, and if a candidate beam list is configured and evaluation of at least one reference signal in the candidate beam list has been completed, the MAC entity of the terminal equipment instructs the multiplexing and assemble entity to generate the TRP-specific beam failure recovery MAC CE or the TRP-specific beam failure MAC CE.

For example:

if the beam failure recovery procedure determines that at least one beam failure recovery has been triggered and not cancelled, or a beam failure is detected, or at least one beam failure indication is triggered and not cancelled, if a candidate beam is configured and evaluation of the candidate beam has been completed, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for the TRP-specific beam failure recovery or the TRP-specific beam failure is triggered for each TRP that has triggered a BFR and has not been cancelled.

In some embodiments, if the beam failure recovery procedure determines that at least one beam failure recovery has been triggered and not cancelled, or a beam failure is detected, or at least one beam failure indication is triggered and not cancelled, and if a candidate beam list is not configured, the MAC entity of the terminal equipment does not determine whether the evaluation of the candidate beam is completed.

For example:

if the beam failure recovery procedure determines that at least one beam failure recovery has been triggered and not cancelled, or a beam failure is detected, or at least one beam failure indication is triggered and not cancelled, if a candidate beam is configured and evaluation of the candidate beam has been completed, or a candidate beam is not configured, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for the TRP-specific beam failure recovery or the TRP-specific beam failure is triggered for each TRP that has triggered a BFR and has not been cancelled.

In some embodiments, the TRP is configured with beam failure recovery or with beam failure recovery parameters, and/or is configured with beam failure detection or with beam failure detection parameters; for each TRP configured with beam failure recovery or with beam failure recovery parameters, and/or configured with beam failure detection or with beam failure detection parameters, the MAC entity will determine whether to instruct generation of an MAC CE or trigger a scheduling request (SR).

For example, for each TRP configured with beam failure recovery or with beam failure recovery parameters, and/or configured with beam failure detection or with beam failure detection parameters, the MAC entity executes the following operations:

if the beam failure recovery procedure determines that at least one beam failure recovery has been triggered and not cancelled, or a beam failure is detected, or at least one beam failure indication is triggered and not cancelled, and evaluation of the candidate beam has been completed, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for the beam failure recovery or the beam failure is triggered for each TRP that has triggered a BFR and has not been cancelled.

In some embodiments, the TRP is configured with beam failure recovery or with beam failure recovery parameters, and/or is configured with beam failure detection or with beam failure detection parameters; for each TRP configured with beam failure recovery or with beam failure recovery parameters, and/or configured with beam failure detection or with beam failure detection parameters, the MAC entity will perform beam failure detection to trigger the BFR.

For example, for a TRP configured with beam failure recovery or beam failure recovery parameters, the MAC entity receives a beam failure instance indication, starts or restarts a transmission reception point (TRP)-specific beam failure detection timer, increments a transmission reception point (TRP)-specific beam failure indication count by 1, and in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered.

In some embodiments, the MAC entity of the terminal equipment determines that the evaluation of the candidate beam has been completed if the candidate beam is not configured in the case where at least one beam failure recovery is triggered.

In some embodiments, the physical layer of the terminal equipment, upon receiving the higher layer request, determines that the evaluation of the candidate beam has been completed in a case where the candidate beam is not configured.

In some embodiments, in a case where a reference signal for beam failure detection is configured, a candidate reference signal is configured. For example, if a reference signal for beam failure detection is configured, a candidate reference signal should be configured.

The TRP-specific beam failure recovery MAC CE or the TRP-specific beam failure MAC CE is schematically described above, and the Fallback mechanism of the embodiment of the present application is described below.

In some embodiments, some or all of the serving cells in the MAC entity of the terminal equipment are configured with TRP-specific beam failure detection, and/or, a special cell in the MAC entity of the terminal equipment is configured with the TRP-specific beam failure detection.

For example, for an MAC entity, the Fallback mechanism is supported if beam failure detection at the TRP level is configured while beam failure detection at the cell level is not configured. Here, the "beam failure detection at the cell level is not configured" includes that all the serving cells configured in the MAC entity are not configured with Rel-15/16 beam failure detection, or the special cell in this MAC entity is not configured with Rel-15/16 beam failure detection.

Specifically, for example, all the serving cells configured in the MAC entity are not configured with beam failure detection, or are not configured with RadioLinkMonitoring-Config, or parameters of beam failure detection are not configured/not included in RadioLink MonitoringConfig. Alternatively, the special cell in the MAC entity is not configured with beam failure detection, or is not configured with RadioLink MonitoringConfig, or parameters of beam failure detection are not configured/not included in RadioLinkMonitoringConfig.

For another example, for an MAC entity, the Fallback mechanism is supported if beam failure recovery at the TRP level is configured while beam failure recovery at the cell level is not configured. Here, the "beam failure recovery at the cell level is not configured" includes that all the serving cells configured in the MAC entity are not configured with Rel-15/16 beam failure recovery, or the special cell in this MAC entity is not configured with Rel-15/16 beam failure recovery.

Specifically, for example, all the serving cells configured in the MAC entity are not configured with beam failure recovery, or are not configured with BeamFailureRecovery-SCell Config, or parameters (e.g., candidateBeamRSSCellList) of the secondary cell beam failure recovery procedure is not configured/not included in BeamFailureRecoveryS-CellConfig. Alternatively, the special cell in the MAC entity is not configured with beam failure recovery, or is not configured with BeamFailureRecoveryConfig, or parameters (e.g., candidateBeamRS List) of the secondary cell beam failure recovery procedure is not configured/not included in BeamFailureRecoveryConfig.

In some embodiments, the MAC entity of the terminal equipment determines whether the transmission reception point belongs to a secondary cell, and in a case where the transmission reception point belongs to a secondary cell, determines that a beam failure occurs in the transmission reception point or beam failure recovery of the transmission reception point is triggered or a beam failure indication of the transmission reception point is triggered.

In some embodiments, the MAC entity of the terminal equipment determines whether all TRPs configured with TRP-specific beam failure detection are triggered for beam failure recovery; in the case where all TRPs configured with TRP-specific beam failure detection are triggered for beam failure recovery, the MAC entity of the terminal equipment initiates a random access procedure in the special cell.

Figure 8A:
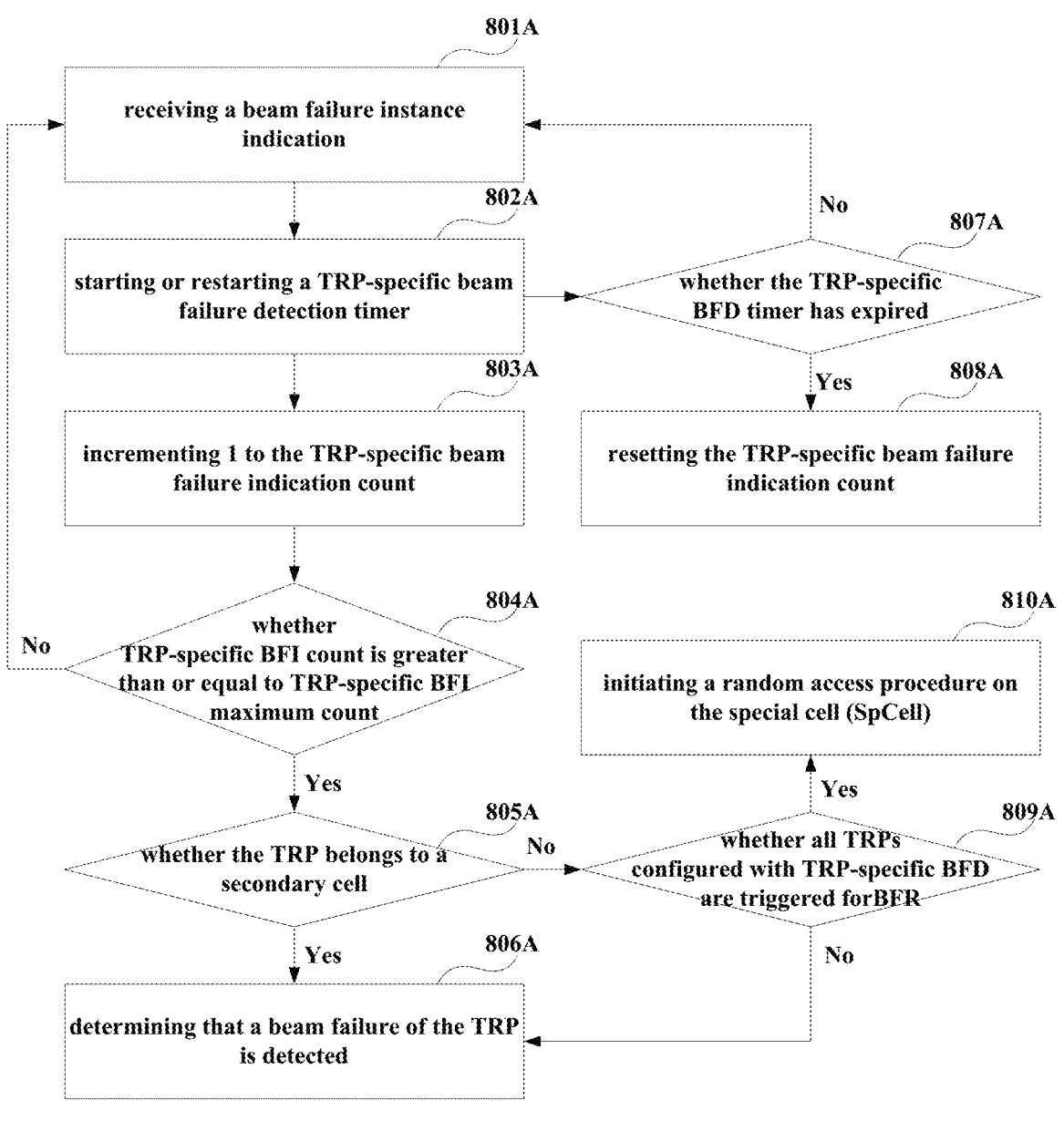
FIG. 8A is another schematic diagram of a method for detecting beam failure according to an embodiment of the present application.

FIG. 8A is another schematic diagram of a method for detecting beam failure according to an embodiment of the present application, schematically illustrating an operation of an MAC entity of a terminal equipment for a TRP configured with beam failure detection. As shown in FIG. 8A, the operation of the MAC entity includes:

801A, receiving a beam failure instance indication from a lower layer;

802A, starting or restarting a transmission reception point (TRP)-specific beam failure detection timer (e.g., beamFailure Detection Timer-per TRP);

803A, incrementing 1 to the TRP-specific beam failure indication count (e.g., BFI_COUNTER-perTRP) associated with the TRP-specific beam failure detection timer (e.g., beam Failure Detection Timer-per TRP);

804A, determining whether the TRP-specific beam failure indication count (e.g., BFI_COUNTER-perTRP) is greater than or equal to the TRP-specific beam failure instance maximum count (e.g., beamFailureInstanceMaxCount-perTRP); and performing 805A if the TRP-specific beam failure indication count (e.g., BFI-_COUNTER-perTRP) is greater than or equal to the TRP-specific beam failure instance maximum count (e.g., beamFailureInstanceMaxCount-per TRP);

805A, determining whether the TRP belongs to the secondary cell (SCell); and performing 806A if the TRP belongs to the secondary cell (SCell) and performing 809A if the TRP does not belong to the secondary cell (SCell);

806A, determining that a beam failure of the TRP is detected or a beam failure recovery (BFR) of the TRP is triggered or a beam failure indication of the TRP is triggered.

As shown in FIG. 8A, the operation of the MAC entity further includes:

807A, determining whether the TRP-specific beam failure detection timer (e.g., beamFailure Detection Timer-per TRP) has expired; and performing 808A in the case where the TRP-specific beam failure detection timer has expired;

808A, resetting the TRP-specific beam failure indication count (e.g., BFI_COUNTER-perTRP) or setting the TRP-specific beam failure indication count (e.g., BFI_COUNTER-perTRP) to 0.

As shown in FIG. 8A, the operation of the MAC entity further includes:

809A, determining whether all TRPs configured with TRP-specific beam failure detection are triggered for beam failure recovery (or determining whether other TRPs of the serving cells that are configured with TRP-specific beam failure detection are all triggered for beam failure recovery); performing 810A in the case where all TRPs configured with TRP-specific beam failure detection are triggered for beam failure recovery (or other TRPs of the serving cells that are configured with TRP-specific beam failure detection are all triggered for beam failure recovery), otherwise performing 806A;

810A, initiating a random access procedure on the special cell (SpCell).

It should be noted that FIG. 8A only schematically illustrates the embodiment of the present application, but the present application is not limited thereto. For example, the execution order between the operations may be appropriately adjusted, and some other operations may be added or some of the operations may be reduced. Those skilled in the art may make appropriate modifications according to the above content, which are not limited to the description of FIG. 8A described above.

As shown in FIG. 8A, for example for a certain TRP, if the UE variable (e.g., BFI_COUNTER-per TRP) of the TRP-specific/per TRP associated with the beam failure indication counter is greater than or equal to the beam failure instance maximum count value, If the TRP belong to a secondary cell, or if the TRP belongs to a special cell and another TRP of this cell has not triggered a BFR, a BFR is triggered for this TRP.

Otherwise, a random access procedure is initiated on this special cell.

In some embodiments, all of the serving cells in the MAC entity of the terminal equipment do not configured with cell-specific beam failure detection, or, a special cell in the MAC entity of the terminal equipment does not configured with the cell-specific beam failure detection. In a case where TRP-specific beam failure is detected or TRP-specific beam failure recovery is triggered at multiple TRPs, the MAC entity of the terminal equipment initiates a random access procedure on the special cell.

For another example, the Fallback mechanism includes initiating a random access procedure on a special cell when the TRP-specific beam failure is detected or the TRP-specific beam failure recovery is triggered at multiple TRPs. Here, the multiple TRPs include all TRPs configured with TRP-specific beam detection of all serving cells configured in a MAC entity, or all TRPs configured with TRP-specific beam detection of a special cell in a MAC entity.

In some embodiments, the multiple TRPs include all TRPs configured with TRP-specific beam failure detection of all serving cells in a MAC entity, or all TRPs configured with TRP-specific beam failure detection of a special cell in a MAC entity.

FIG. 8B is another schematic diagram of a method for detecting beam failure according to an embodiment of the present application, schematically illustrating an operation of an MAC entity of a terminal equipment for a TRP configured with beam failure detection. As shown in FIG. 8B, the operation of the MAC entity includes:

801B, receiving a beam failure instance indication from a lower layer;

802B, starting or restarting a transmission reception point (TRP)-specific beam failure detection timer (e.g., beamFailure Detection Timer-per TRP);

803B, incrementing 1 to the TRP-specific beam failure indication count (e.g., BFI_COUNTER-perTRP) associated with the TRP-specific beam failure detection timer (e.g., beamFailureDetectionTimer-per TRP);

804B, determining whether the TRP-specific beam failure indication count (e.g., BFI_COUNTER-perTRP) is greater than or equal to the TRP-specific beam failure instance maximum count (e.g., beamFailureInstanceMaxCount-perTRP); and performing 805B if the TRP-specific beam failure indication count (e.g., BFI_COUNTER-perTRP) is greater than or equal to the TRP-specific beam failure instance maximum count (e.g., beamFailureInstanceMaxCount-per TRP);

805B, determining whether the TRP-specific beam failure is detected or TRP-specific BFR is triggered at multiple TRPs; and performing 806B if not, and performing 809B if yes;

The multiple TRPs include all TRPs configured with TRP-specific beam failure detection of all serving cells in the MAC entity, or all TRPs configured with TRP-specific beam failure detection of a special cell in the MAC entity.

806B, determining that a beam failure of the TRP is detected or a beam failure recovery (BFR) of the TRP is triggered or a beam failure indication of the TRP is triggered.

As shown in FIG. 8B, the operation of the MAC entity further includes:

807B, determining whether the TRP-specific beam failure detection timer (e.g., beamFailure Detection Timer-per TRP) has expired; and performing 808B in the case where the TRP-specific beam failure detection timer has expired;

808B, resetting the TRP-specific beam failure indication count (e.g., BFI_COUNTER-per TRP) or setting the TRP-specific beam failure indication count (e.g., BFI_COUNTER-perTRP) to 0.

As shown in FIG. 8B, the operation of the MAC entity further includes:

809B, initiating a random access procedure on the special cell (SpCell).

It should be noted that FIG. 8B only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 8B described above.

Thus, a beam failure is detected on one of the TRPs of a special cell, the terminal equipment may trigger the BFR; and random access (RA) is triggered only if beam failure is detected on all TRPs (configured with the TRP-specific beam failure detection) of the special cell. Unnecessary random access can be avoided, thereby avoiding waste of random access resources and longer service interruption.

For another example, as long as a TRP-specific BFR is configured, a cell-specific BFD on a specific cell should be configured, or a cell-specific BFD on a belonging cell should be configured or a cell-specific BFD on at least one cell should be configured, this may eliminate the need for the fallback mechanism described above.

In some embodiments, the terminal equipment may perform one or any combination of the following:

in the case where the terminal equipment transmits an MAC PDU and the MAC PDU includes a TRP-specific beam failure recovery MAC CE or a TRP-specific beam failure MAC CE, the terminal equipment cancels all of the beam failure recovery triggered for the TRPs before assembly of the MAC PDU;

in the case where the terminal equipment transmits an MAC PDU, and the MAC PDU includes a beam failure recovery MAC CE or a truncated beam failure recovery MAC CE, and the MAC CE includes beam failure information of a cell, the MAC entity of the terminal equipment cancels all of the beam failure recovery triggered for all TRPs included in the cell before assembly of the MAC PDU;

if a PDCCH addressed by the C-RNTI indicates receipt of uplink grant for a new transmission of a HARQ process for transmission including a TRP-specific beam failure recovery MAC CE or a TRP-specific beam failure MAC CE, the MAC entity of the terminal equipment cancels all beam failure recovery triggered for the TRP;

if a PDCCH addressed by the C-RNTI indicates receipt of uplink grant for a new transmission of a HARQ process for transmission including a beam failure recovery MAC CE or a truncated beam failure recovery MAC CE of beam failure information of a cell, the MAC entity of the terminal equipment cancels all beam failure recovery triggered for all TRPs included in the cell.

The Fallback mechanism and the cancellation of the BFR are schematically described above, and the SR is described below.

In some embodiments, the terminal equipment triggers a scheduling request (SR) for the TRP-specific beam failure recovery or the TRP-specific beam failure, for a TRP that has triggered a BFR and has not been cancelled.

In some embodiments, the scheduling request configures a SR ID or a set of SR IDs.

For example, SchedulingRequestId=(0 . . . 7); the present application is not limited to this.

In some embodiments, the configuration value of the TRP-specific beam failure recovery SR ID (e.g., SchedulingRequestId) is the same as the configuration value of the cell-specific beam failure recovery SR ID, or the configuration value of the TRP-specific beam failure recovery SR ID is different from configuration value of the cell-specific beam failure recovery SR ID.

The configuration of the SR may be included in IE MAC-CellGroupConfig or in IE CellGroupConfig.

For example, an SR ID is configured and included in IE MAC-CellGroupConfig. As shown in Tables 1 and 2 below:

TABLE 1

The IE MAC-CellGroupConfig is used to configure MAC parameters for a cell group, including DRX.
MAC-CellGroupConfig information element

```
-- ASN1START
-- TAG-MAC-CELLGROUPCONFIG-START
MAC-CellGroupConfig ::=        SEQUENCE {
    drx-Config                      SetupRelease { DRX-Config }
```

TABLE 1-continued

The IE MAC-CellGroupConfig is used to configure MAC parameters for a cell group,
including DRX.
MAC-CellGroupConfig information element

```
OPTIONAL,   -- Need M
     schedulingRequestConfig          SchedulingRequestConfig
OPTIONAL,   -- Need M
     bsr-Config                       BSR-Config
OPTIONAL,   -- Need M
     tag-Config                       TAG-Config
OPTIONAL,   -- Need M
     phr-Config                       SetupRelease { PHR-Config }
OPTIONAL,   -- Need M
     skipUplinkTxDynamic              BOOLEAN, ...,
     [[
     csi-Mask                         BOOLEAN
OPTIONAL,   -- Need M
     dataInactivityTimer   SetupRelease { DataInactivityTimer }   OPTIONAL   --
Cond MCG-Only
     ]],
     [[
     usePreBSR-r16                    ENUMERATED { true}
OPTIONAL,   -- Need R
     schedulingRequestID-LBT-SCell-r16       SchedulingRequestId
OPTIONAL,   -- Need R
     lch-BasedPrioritization-r16      ENUMERATED {enabled}
OPTIONAL,   -- Need R
     schedulingRequestID-BFR-SCell-r16       SchedulingRequestId
OPTIONAL,   -- Need R
     drx-ConfigSecondaryGroup-r16 SetupRelease { DRX-ConfigSecondaryGroup }
OPTIONAL -- Need M
     schedulingRequestID-BFR-TRP-r17       SchedulingRequestId
OPTIONAL,   -- Need R
     ]]
}
DataInactivityTimer ::=          ENUMERATED {s1, s2, s3, s5, s7, s10, s15, s20, s40, s50,
s60, s80, s100, s120, s150, s180}
-- TAG-MAC-CELLGROUPCONFIG-STOP
-- ASN1STOP
```

TABLE 2

MAC-CellGroupConfig field descriptions usePreBSR
If set to true, the MAC entity of the IAB-MT may use the Pre-emptive BSR, see TS 38.321
[3].
csi-Mask
If set to true, the UE limits CSI reports to the on-duration period of the DRX cycle, see TS
38.321 [3].
dataInactivityTimer
Releases the RRC connection upon data inactivity as specified in clause 5.3.8.5 and in TS
38.321 [3]. Value s1 corresponds to 1 second, value s2 corresponds to 2 seconds, and so on.
drx-Config
Used to configure DRX as specified in TS 38.321 [3].
drx-ConfigSecondaryGroup
Used to configure DRX related parameters for the second DRX group as specified in TS
38.321 [3]. The network does not configure secondary DRX group with DCP simultaneously
nor secondary DRX group with a dormant BWP simultaneously.
lch-BasedPrioritization
If this field is present, the corresponding MAC entity of the UE is configured with
prioritization between overlapping grants and between scheduling request and overlapping
grants based on LCH priority, see TS 38.321 [3].
schedulingRequestID-BFR-SCell
Indicates the scheduling request configuration applicable for BFR on SCell, as specified in
TS 38.321 [3].
schedulingRequestID-LBT-SCell
Indicates the scheduling request configuration applicable for consistent uplink LBT recovery
on SCell, as specified in TS 38.321 [3].
schedulingRequestID-BFR-TRP
Indicates the scheduling request configuration applicable for TRP specific BFR, as
specified in TS 38.321 [3].
skipUplinkTxDynamic
If set to true, the UE skips UL transmissions as described in TS 38.321 [3].
tag-Config TABLE 2-continued

| MAC-CellGroupConfig field descriptions |
| --- |
| The field is used to configure parameters for a time-alignment group. The field is not present if any DAPS bearer is configured. |

As another example, a set of SR IDs are configured and included in IE MAC-CellGroup Config. As shown in Tables 3 and 4:

TABLE 3

| MAC-CellGroupConfig information element |
| --- |

```
-- ASN1START
-- TAG-MAC-CELLGROUPCONFIG-START
MAC-CellGroupConfig ::=            SEQUENCE {
    drx-Config                        SetupRelease { DRX-Config }
OPTIONAL,   -- Need M
    schedulingRequestConfig           SchedulingRequestConfig
OPTIONAL,   -- Need M
    bsr-Config                        BSR-Config
OPTIONAL,   -- Need M
    tag-Config                        TAG-Config
OPTIONAL,   -- Need M
    phr-Config                        SetupRelease { PHR-Config }
OPTIONAL,   -- Need M
    skipUplinkTxDynamic               BOOLEAN, ...,
    [[
    csi-Mask                          BOOLEAN
OPTIONAL,   -- Need M
    dataInactivityTimer   SetupRelease { DataInactivityTimer } OPTIONAL   --
Cond MCG-Only
    ]],
    [[
    usePreBSR-r16                     ENUMERATED {true}
OPTIONAL,   -- Need R
    schedulingRequestID-LBT-SCell-r16         SchedulingRequestId
OPTIONAL,   -- Need R
    lch-BasedPrioritization-r16       ENUMERATED {enabled}
OPTIONAL,   -- Need R
    schedulingRequestID-BFR-SCell-r16         SchedulingRequestId
OPTIONAL,   -- Need R
    drx-ConfigSecondaryGroup-r16 SetupRelease { DRX-ConfigSecondaryGroup }
OPTIONAL -- Need M
    schedulingRequestIDList-BFR-TRP-r17       SEQUENCE (SIZE (1..
maxNrofSR-TRP-BFR) OF SchedulingRequestId          OPTIONAL,   --
Need R
    ]]
}
DataInactivityTimer ::=      ENUMERATED {s1, s2, s3, s5, s7, s10, s15, s20, s40, s50,
s60, s80, s100, s120, s150, s180}
-- TAG-MAC-CELLGROUPCONFIG-STOP
-- ASN1STOP
```

TABLE 4

| MAC-CellGroupConfig field descriptions |
| --- |
| usePreBSR<br>If set to true, the MAC entity of the IAB-MT may use the Pre-emptive BSR, see TS 38.321 [3].<br>csi-Mask<br>If set to true, the UE limits CSI reports to the on-duration period of the DRX cycle, see TS 38.321 [3].<br>dataInactivityTimer<br>Releases the RRC connection upon data inactivity as specified in clause 5.3.8.5 and in TS 38.321 [3]. Value s1 corresponds to 1 second, value s2 corresponds to 2 seconds, and so on.<br>drx-Config<br>Used to configure DRX as specified in TS 38.321 [3].<br>drx-ConfigSecondaryGroup<br>Used to configure DRX related parameters for the second DRX group as specified in TS 38.321 [3]. The network does not configure secondary DRX group with DCP simultaneously |

TABLE 4-continued

| MAC-CellGroupConfig field descriptions |
| --- | nor secondary DRX group with a dormant BWP simultaneously.
lch-BasedPrioritization
If this field is present, the corresponding MAC entity of the UE is configured with
prioritization between overlapping grants and between scheduling request and overlapping
grants based on LCH priority, see TS 38.321 [3].
schedulingRequestID-BFR-SCell
Indicates the scheduling request configuration applicable for BFR on SCell, as specified in
TS 38.321 [3].
schedulingRequestID-LBT-SCell
Indicates the scheduling request configuration applicable for consistent uplink LBT recovery
on SCell, as specified in TS 38.321 [3].
schedulingRequestIDList-BFR-TRP
List of the scheduling request configuration applicable for TRP specific BFR, as
specified in TS 38.321 [3].
skipUplinkTxDynamic
If set to true, the UE skips UL transmissions as described in TS 38.321 [3].
tag-Config
The field is used to configure parameters for a time-alignment group. The field is not present
if any DAPS bearer is configured.

For another example, an SR ID is configured and included
in IE CellGroupConfig. As shown in Tables 5 and 6:

TABLE 5

| The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells). CellGroupConfig information element |
| --- |

```
-- ASN1START
-- TAG-CELLGROUPCONFIG-START
-- Configuration of one Cell-Group:
CellGroupConfig ::=                 SEQUENCE {
    cellGroupId                         CellGroupId,
    rlc-BearerToAddModList                   SEQUENCE (SIZE(1..maxLC-ID)) OF RLC-
BearerConfig     OPTIONAL,     -- Need N
    rlc-BearerToReleaseList              SEQUENCE (SIZE(1..maxLC-ID)) OF
LogicalChannelIdentity                       OPTIONAL,      -- Need N
    mac-CellGroupConfig                      MAC-CellGroupConfig
OPTIONAL,   -- Need M
    physicalCellGroupConfig                  PhysicalCellGroupConfig
OPTIONAL,   -- Need M
    spCellConfig                             SpCellConfig
OPTIONAL,   -- Need M
    sCellToAddModList                        SEQUENCE (SIZE (1..maxNrofSCells)) OF
SCellConfig                          OPTIONAL,   -- Need N
    sCellToReleaseList                   SEQUENCE (SIZE (1..maxNrofSCells)) OF
SCellIndex                           OPTIONAL,   -- Need N ...,
    [[
    reportUplinkTxDirectCurrent          ENUMERATED {true}              OPTIONAL
-- Cond BWP-Reconfig
    ]],
    [[
    bap-Address-r16                          BIT STRING (SIZE (10))
OPTIONAL,   -- Need M
    bh-RLC-ChannelToAddModList-r16                           SEQUENCE (SIZE(1..maxBH-
RLC-ChannelID-r16)) OF BH-RLC-ChannelConfig-r16 OPTIONAL,   -- Need N
    bh-RLC-ChannelToReleaseList-r16                      SEQUENCE (SIZE(1..maxBH-
RLC-ChannelID-r16)) OF BH-RLC-ChannelID-r16               OPTIONAL,   -- Need N
    f1c-TransferPath-r16                 ENUMERATED {lte, nr, both}
OPTIONAL,      -- Need M
    simultaneousTCI-UpdateList1-r16                      SEQUENCE (SIZE
(1..maxNrofServingCellsTCI-r16)) OF ServCellIndex                  OPTIONAL,   -- Need R
    simultaneousTCI-UpdateList2-r16                      SEQUENCE (SIZE
(1..maxNrofServingCellsTCI-r16)) OF ServCellIndex                  OPTIONAL,   -- Need R
    simultaneousSpatial-UpdatedList1-r16             SEQUENCE (SIZE
(1..maxNrofServingCellsTCI-r16)) OF ServCellIndex                  OPTIONAL,   -- Need R
    simultaneousSpatial-UpdatedList2-r16             SEQUENCE (SIZE
(1..maxNrofServingCellsTCI-r16)) OF ServCellIndex                  OPTIONAL,   -- Need R
    uplinkTxSwitchingOption-r16              ENUMERATED {switchedUL, dualUL}
OPTIONAL,      -- Need R
    uplinkTxSwitchingPowerBoosting-r16                       ENUMERATED {enabled}
```

TABLE 5-continued

The CellGroupConfig IE is used to configure a master cell group (MCG) or secondary cell
group (SCG). A cell group comprises of one MAC entity, a set of logical channels with
associated RLC entities and of a primary cell (SpCell) and one or more secondary cells
(SCells).
CellGroupConfig information element

```
OPTIONAL      -- Need R
    schedulingRequestID-BFR-TRP-r17              SchedulingRequestId
OPTIONAL,   -- Need R
]]
}
-- Serving cell specific MAC and PHY parameters for a SpCell:
SpCellConfig ::=                 SEQUENCE {
    servCellIndex                ServCellIndex
OPTIONAL,   -- Cond SCG
    reconfigurationWithSync      ReconfigurationWithSync      OPTIONAL,   -- Cond
ReconfWithSync
    rlf-TimersAndConstants       SetupRelease { RLF-TimersAndConstants }
OPTIONAL,   -- Need M
    rlmInSyncOutOfSyncThreshold          ENUMERATED {n1}
OPTIONAL,   -- Need S
    spCellConfigDedicated                ServingCellConfig
OPTIONAL,   -- Need M
    ...
}
ReconfigurationWithSync ::=        SEQUENCE {
    spCellConfigCommon                   ServingCellConfigCommon
OPTIONAL,   -- Need M
    newUE-Identity                RNTI-Value,
    t304                          ENUMERATED {ms50, ms100, ms150, ms200,
ms500, ms1000, ms2000, ms10000},
    rach-ConfigDedicated          CHOICE {
        uplink                        RACH-ConfigDedicated,
        supplementaryUplink           RACH-ConfigDedicated
    }
OPTIONAL,   -- Need N
    ...,
    [[
    smtc                          SSB-MTC
OPTIONAL   -- Need S
    ]],
    [[
    daps-UplinkPowerConfig-r16        DAPS-UplinkPowerConfig-r16
OPTIONAL   -- Need N
    ]]
}
DAPS-UplinkPowerConfig-r16 ::=        SEQUENCE {
    p-DAPS-Source-r16                 P-Max,
    p-DAPS-Target-r16                 P-Max,
    uplinkPowerSharingDAPS-Mode-r16        ENUMERATED {semi-static-mode1,
semi-static-mode2, dynamic }
}
SCellConfig ::=                  SEQUENCE {
    sCellIndex                    SCellIndex,
    sCellConfigCommon                 ServingCellConfigCommon   OPTIONAL,
-- Cond SCellAdd
    sCellConfigDedicated          ServingCellConfig         OPTIONAL,     --
Cond SCellAddMod
    ...,
    [[
    smtc                          SSB-MTC                       OPTIONAL
-- Need S
    ]],
    [[
    sCellState-r16                ENUMERATED {activated}   OPTIONAL,
-- Cond SCellAddSync
    secondaryDRX-GroupConfig-r16          ENUMERATED {true}         OPTIONAL
-- Cond DRX-Config2
    ]]}
-- TAG-CELLGROUPCONFIG-STOP
-- ASN1STOP
```

TABLE 6

| CellGroupConfig field descriptions |
| --- |
| bap-Address<br>BAP address of the parent node in cell group.<br>bh-RLC-ChannelToAddModList<br>Configuration of the backhaul RLC entities and the corresponding MAC Logical Channels<br>to be added and modified.<br>bh-RLC-ChannelToReleaseList<br>List of the backhaul RLC entities and the corresponding MAC Logical Channels to be<br>released.<br>f1c-TransferPath<br>The F1-C transfer path that an EN-DC IAB-MT should use for transferring F1-C packets to<br>the IAB-donor-CU. If IAB-MT is configured with lte, IAB-MT can only use LTE leg for F1-<br>C transfer. If IAB-MT is configured with nr, IAB-MT can only use NR leg for F1-C transfer.<br>If IAB-MT is configured with both, it is up to IAB-MT to select an LTE leg or a NR leg for<br>F1-C transfer. If the field is not configured, the IAB node uses the NR leg as the default one.<br>mac-CellGroupConfig<br>MAC parameters applicable for the entire cell group.<br>rlc-BearerToAddModList<br>Configuration of the MAC Logical Channel, the corresponding RLC entities and association<br>with radio bearers.<br>reportUplinkTxDirectCurrent<br>Enables reporting of uplink and supplementary uplink Direct Current location information<br>upon BWP configuration and reconfiguration. This field is only present when the BWP<br>configuration is modified or any serving cell is added or removed. This field is absent in the<br>IE CellGroupConfig when provided as part of RRCSetup message. If UE is configured with<br>SUL carrier, UE reports both UL and SUL Direct Current locations.<br>rlmInSyncOutOfSyncThreshold<br>BLER threshold pair index for IS/OOS indication generation, see TS 38.133 [14], table 8.1.1-<br>1. n1 corresponds to the value 1. When the field is absent, the UE applies the value 0.<br>Whenever this is reconfigured, UE resets N310 and N311, and stops T310, if running.<br>Network does not include this field.<br>sCellState<br>Indicates whether the SCell shall be considered to be in activated state upon SCell<br>configuration.<br>sCellToAddModList<br>List of secondary serving cells (SCells) to be added or modified.<br>sCellToReleaseList<br>List of secondary serving cells (SCells) to be released.<br>schedulingRequestID-BFR-TRP<br>Indicates the scheduling request configuration applicable for TRP specific BFR, as<br>specified in TS 38.321 [3].<br>secondaryDRX-GroupConfig<br>The field is used to indicate whether the SCell belongs to the secondary DRX group. All<br>serving cells in the secondary DRX group shall belong to one Frequency Range and all<br>serving cells in the legacy DRX group shall belong to another Frequency Range.<br>simultaneousTCI-UpdateList1, simultaneousTCI-UpdateList2<br>List of serving cells which can be updated simultaneously for TCI relation with a MAC CE.<br>The simultaneousTCI-UpdateList1 and simultaneousTCI-UpdateList2 shall not contain same<br>serving cells. Network should not configure serving cells that are configured with a BWP<br>with two different values for the coresetPoolIndex in these lists.<br>simultaneousSpatial-UpdatedList1, simultaneousSpatial-UpdatedList2<br>List of serving cells which can be updated simultaneously for spatial relation with a MAC<br>CE. The simultaneousSpatial-UpdatedList1 and simultaneousSpatial-UpdatedList2 shall not<br>contain same serving cells. Network should not configure serving cells that are configured<br>with a BWP with two different values for the coresetPoolIndex in these lists.<br>spCellConfig<br>Parameters for the SpCell of this cell group (PCell of MCG or PSCell of SCG).<br>uplinkTxSwitchingOption<br>Indicates which option is configured for dynamic UL Tx switching for inter-band UL CA or<br>(NG)EN-DC. The field is set to switchedUL if network configures option 1 as specified in<br>TS 38.214 [19], or dualUL if network configures option 2 as specified in TS 38.214 [19].<br>Network always configures UE with a value for this field in inter-band UL CA case and<br>(NG)EN-DC case where UE supports dynamic UL Tx switching.<br>uplinkTxSwitchingPowerBoosting<br>Indicates whether the UE is allowed to enable 3dB boosting on the maximum output power<br>for transmission on carrier2 under the operation state in which 2-port transmission can be<br>supported on carrier2 for inter-band UL CA case with dynamic UL Tx switching as defined<br>in TS 38.101-1 [15]. Network can only configure this field for dynamic UL Tx switching in<br>inter-band UL CA case with power Class 3 as defined in TS 38.101-1 [15]. |

As another example, a set of SR IDs are configured and included in IE CellGroupConfig. As shown in Tables 7 and 8:

TABLE 7

| CellGroupConfig information element |
|---|

```
-- ASN1START
-- TAG-CELLGROUPCONFIG-START
-- Configuration of one Cell-Group:
CellGroupConfig ::=                   SEQUENCE {
    cellGroupId                           CellGroupId,
    rlc-BearerToAddModList                SEQUENCE (SIZE(1..maxLC-ID)) OF RLC-
BearerConfig      OPTIONAL,        -- Need N
    rlc-BearerToReleaseList               SEQUENCE (SIZE(1..maxLC-ID)) OF
LogicalChannelIdentity                    OPTIONAL,    -- Need N
    mac-CellGroupConfig                   MAC-CellGroupConfig
OPTIONAL,    -- Need M
    physicalCellGroupConfig               PhysicalCellGroupConfig
OPTIONAL,    -- Need M
    spCellConfig                          SpCellConfig
OPTIONAL,    -- Need M
    sCellToAddModList                         SEQUENCE (SIZE (1..maxNrofSCells)) OF
SCellConfig                           OPTIONAL,    -- Need N
    sCellToReleaseList                    SEQUENCE (SIZE (1..maxNrofSCells)) OF
SCellIndex                            OPTIONAL,    -- Need N ...,
    [[
    reportUplinkTxDirectCurrent     ENUMERATED {true}      OPTIONAL
-- Cond BWP-Reconfig
    ]],
    [[
    bap-Address-r16                 BIT STRING (SIZE (10))
OPTIONAL,    -- Need M
    bh-RLC-ChannelToAddModList-r16                    SEQUENCE (SIZE(1..maxBH-
RLC-ChannelID-r16)) OF BH-RLC-ChannelConfig-r16 OPTIONAL,    -- Need N
    bh-RLC-ChannelToReleaseList-r16                   SEQUENCE (SIZE(1..maxBH-
RLC-ChannelID-r16)) OF BH-RLC-ChannelID-r16      OPTIONAL,    -- Need N
    f1c-TransferPath-r16            ENUMERATED {lte, nr, both}
OPTIONAL,    -- Need M
    simultaneousTCI-UpdateList1-r16                   SEQUENCE (SIZE
(1..maxNrofServingCellsTCI-r16)) OF ServCellIndex            OPTIONAL,   -- Need R
    simultaneousTCI-UpdateList2-r16                   SEQUENCE (SIZE
(1..maxNrofServingCellsTCI-r16)) OF ServCellIndex            OPTIONAL,   -- Need R
    simultaneousSpatial-UpdatedList1-r16         SEQUENCE (SIZE
(1..maxNrofServingCellsTCI-r16)) OF ServCellIndex            OPTIONAL,   -- Need R
    simultaneousSpatial-UpdatedList2-r16         SEQUENCE (SIZE
(1..maxNrofServingCellsTCI-r16)) OF ServCellIndex            OPTIONAL,   -- Need R
    uplinkTxSwitchingOption-r16         ENUMERATED {switchedUL, dualUL}
OPTIONAL,    -- Need R
    uplinkTxSwitchingPowerBoosting-r16           ENUMERATED {enabled}
OPTIONAL    -- Need R
    schedulingRequestIDList-BFR-TRP-r17          SEQUENCE (SIZE (1..
maxNrofSR-TRP-BFR) OF SchedulingRequestId                    OPTIONAL,      --
Need R
    ]]
}
--Serving cell specific MAC and PHY parameters for a SpCell:
SpCellConfig ::=                    SEQUENCE {
    servCellIndex                         ServCellIndex
OPTIONAL,    -- Cond SCG
    reconfigurationWithSync   ReconfigurationWithSync   OPTIONAL,   -- Cond
ReconfWithSync
    rlf-TimersAndConstants          SetupRelease { RLF-TimersAndConstants }
OPTIONAL,    -- Need M
    rlmInSyncOutOfSyncThreshold           ENUMERATED {n1}
OPTIONAL,    -- Need S
    spCellConfigDedicated                 ServinCellConfig
OPTIONAL,    -- Need M

...
}

ReconfigurationWithSync ::=         SEQUENCE {
    spCellConfigCommon                    ServingCellConfigCommon
OPTIONAL,    -- Need M
    newUE-Identity                        RNTI-Value,
    t304                                  ENUMERATED {ms50, ms100, ms150, ms200,
ms500, ms1000, ms2000, ms10000},
    rach-ConfigDedicated            CHOICE {
        uplink                              RACH-ConfigDedicated,
        supplementaryUplink                 RACH-ConfigDedicated
```

TABLE 7-continued

| CellGroupConfig information element |
|---|

```
        }
OPTIONAL,    -- Need N
    ...,
    [[
    smtc                        SSB-MTC
OPTIONAL    -- Need S
    ]],
    [[
    daps-UplinkPowerConfig-r16        DAPS-UplinkPowerConfig-r16
OPTIONAL    -- Need N
    ]]
}
DAPS-UplinkPowerConfig-r16 ::=        SEQUENCE {
    p-DAPS-Source-r16                    P-Max,
    p-DAPS-Target-r16                P-Max,
    uplinkPowerSharingDAPS-Mode-r16        ENUMERATED {semi-static-mode1,
semi-static-mode2, dynamic }
}
SCellConfig ::=                SEQUENCE {
    sCellIndex                    SCellIndex,
    sCellConfigCommon                    ServingCellConfigCommon    OPTIONAL,
-- Cond SCellAdd
    sCellConfigDedicated        ServingCellConfig            OPTIONAL,    --
Cond SCellAddMod
    ...,
    [[
    smtc                    SSB-MTC                    OPTIONAL
-- Need S
    ]],
    [[
    sCellState-r16                ENUMERATED {activated}        OPTIONAL,
-- Cond SCellAddSync
    secondaryDRX-GroupConfig-r16        ENUMERATED {true}            OPTIONAL
-- Cond DRX-Config2
    ]]}
-- TAG-CELLGROUPCONFIG-STOP
-- ASN1STOP
```

TABLE 8

| CellGroupConfig field descriptions |
|---| bap-Address
BAP address of the parent node in cell group.
bh-RLC-ChannelToAddModList
Configuration of the backhaul RLC entities and the corresponding MAC Logical Channels
to be added and modified.
bh-RLC-ChannelToReleaseList
List of the backhaul RLC entities and the corresponding MAC Logical Channels to be
released.
f1c-TransferPath
The F1-C transfer path that an EN-DC IAB-MT should use for transferring F1-C packets to
the IAB-donor-CU. If IAB-MT is configured with lte, IAB-MT can only use LTE leg for F1-
C transfer. If IAB-MT is configured with nr, IAB-MT can only use NR leg for F1-C transfer.
If IAB-MT is configured with both, it is up to IAB-MT to select an LTE leg or a NR leg for
F1-C transfer. If the field is not configured, the IAB node uses the NR leg as the default one.
mac-CellGroupConfig
MAC parameters applicable for the entire cell group.
rlc-BearerToAddModList
Configuration of the MAC Logical Channel, the corresponding RLC entities and association
with radio bearers.
reportUplinkTxDirectCurrent
Enables reporting of uplink and supplementary uplink Direct Current location information
upon BWP configuration and reconfiguration. This field is only present when the BWP
configuration is modified or any serving cell is added or removed. This field is absent in the
IE CellGroupConfig when provided as part of RRCSetup message. If UE is configured with
SUL carrier, UE reports both UL and SUL Direct Current locations.
rlmInSyncOutOfSyncThreshold
BLER threshold pair index for IS/OOS indication generation, see TS 38.133 [14], table 8.1.1-
1. n1 corresponds to the value 1. When the field is absent, the UE applies the value 0.
Whenever this is reconfigured, UE resets N310 and N311, and stops T310, if running.
Network does not include this field.
sCellState
Indicates whether the SCell shall be considered to be in activated state upon SCell
configuration.

TABLE 8-continued

| CellGroupConfig field descriptions |
|---|
| sCellToAddModList |
| List of secondary serving cells (SCells) to be added or modified. |
| sCellToReleaseList |
| List of secondary serving cells (SCells) to be released. |
| schedulingRequestIDList-BFR-TRP |
| List of the scheduling request configuration applicable for TRP specific BFR, as |
| specified in TS 38.321 [3]. |
| secondaryDRX-GroupConfig |
| The field is used to indicate whether the SCell belongs to the secondary DRX group. All |
| serving cells in the secondary DRX group shall belong to one Frequency Range and all |
| serving cells in the legacy DRX group shall belong to another Frequency Range. |
| simultaneousTCI-UpdateList1, simultaneousTCI-UpdateList2 |
| List of serving cells which can be updated simultaneously for TCI relation with a MAC CE. |
| The simultaneousTCI-UpdateList1 and simultaneousTCI-UpdateList2 shall not contain same |
| serving cells. Network should not configure serving cells that are configured with a BWP |
| with two different values for the coresetPoolIndex in these lists. |
| simultaneousSpatial-UpdatedList1, simultaneousSpatial-UpdatedList2 |
| List of serving cells which can be updated simultaneously for spatial relation with a MAC |
| CE. The simultaneousSpatial-UpdatedList1 and simultaneousSpatial-UpdatedList2 shall not |
| contain same serving cells. Network should not configure serving cells that are configured |
| with a BWP with two different values for the coresetPoolIndex in these lists. |
| spCellConfig |
| Parameters for the SpCell of this cell group (PCell of MCG or PSCell of SCG). |
| uplinkTxSwitchingOption |
| Indicates which option is configured for dynamic UL Tx switching for inter-band UL CA or |
| (NG)EN-DC. The field is set to switchedUL if network configures option 1 as specified in |
| TS 38.214 [19], or dualUL if network configures option 2 as specified in TS 38.214 [19]. |
| Network always configures UE with a value for this field in inter-band UL CA case and |
| (NG)EN-DC case where UE supports dynamic UL Tx switching. |
| uplinkTxSwitchingPowerBoosting |
| Indicates whether the UE is allowed to enable 3dB boosting on the maximum output power |
| for transmission on carrier2 under the operation state in which 2-port transmission can be |
| supported on carrier2 for inter-band UL CA case with dynamic UL Tx switching as defined |
| in TS 38.101-1 [15]. Network can only configure this field for dynamic UL Tx switching in |
| inter-band UL CA case with power Class 3 as defined in TS 38.101-1 [15]. |

In some embodiments, the configuration values of the TRP-specific beam failure recovery SR ID and the control resource pool index (e.g., SchedulingRequestId+coresetPoolIndex-r16) are the same as the configuration value of the cell-specific beam failure recovery SR ID, or the configuration values of the TRP-specific beam failure recovery SR ID and the control resource pool index are different from the configuration value of the cell-specific beam failure recovery SR ID.

For example, control resource pool index: coresetPoolIndex-r16=0/1; the present application is not limited thereto.

For example, an SR ID is configured and included in IE MAC-CellGroupConfig. As shown in Tables 9 to 11:

TABLE 9

| MAC-CellGroupConfig information element |
|---|
| -- ASN1START |
| -- TAG-MAC-CELLGROUPCONFIG-START |
| MAC-CellGroupConfig ::=          SEQUENCE { |
|      drx-Config                     SetupRelease { DRX-Config } |
| OPTIONAL,   -- Need M |
|      schedulingRequestConfig         SchedulingRequestConfig |
| OPTIONAL,   -- Need M |
|      bsr-Config                      BSR-Config |
| OPTIONAL,   -- Need M |
|      tag-Config                      TAG-Config |
| OPTIONAL,   -- Need M |
|      phr-Config                      SetupRelease { PHR-Config } |
| OPTIONAL,   -- Need M |
|      skipUplinkTxDynamic             BOOLEAN, |
|      ..., |
|      [[ |
|      csi-Mask                        BOOLEAN |
| OPTIONAL,   -- Need M |
|      dataInactivity Timer   SetupRelease { DataInactivityTimer }   OPTIONAL     -- |
| Cond MCG-Only |
|      ]], |
|      [[ |
|      usePreBSR-r16                   ENUMERATED {true} |
| OPTIONAL,   -- Need R |

TABLE 9-continued

| MAC-CellGroupConfig information element |
|---|
|       schedulingRequestID-LBT-SCell-r16                 SchedulingRequestId<br>OPTIONAL,   -- Need R<br>      lch-BasedPrioritization-r16              ENUMERATED {enabled}<br>OPTIONAL,   -- Need R<br>      schedulingRequestID-BFR-SCell-r16            SchedulingRequestId<br>OPTIONAL,   -- Need R<br>      drx-ConfigSecondaryGroup-r16 SetupRelease { DRX-ConfigSecondaryGroup }<br>OPTIONAL -- Need M<br>      schedulingRequestID-BFR-TRP-r17             SchedulingRequestId-BFR-TRP<br>OPTIONAL,   -- Need R<br>]]<br>}<br>DataInactivityTimer ::=        ENUMERATED {s1, s2, s3, s5, s7, s10, s15, s20, s40,<br>s50, s60, s80, s100, s120, s150, s180}<br>SchedulingRequestId-BFR-TRP ::=   SEQUENCE {<br>      coresetPoolIndex-r17               INTEGER (0..1)<br>OPTIONAL, -- Need R<br>      schedulingRequestId               SchedulingRequestId<br>}<br>-- TAG-MAC-CELLGROUPCONFIG-STOP<br>-- ASN1STOP |

TABLE 10

| MAC-CellGroupConfig field descriptions |
|---|
| usePreBSR<br>If set to true, the MAC entity of the IAB-MT may use the Pre-emptive BSR, see TS 38.321<br>[3].<br>csi-Mask<br>If set to true, the UE limits CSI reports to the on-duration period of the DRX cycle, see TS<br>38.321 [3].<br>dataInactivityTimer<br>Releases the RRC connection upon data inactivity as specified in clause 5.3.8.5 and in TS<br>38.321 [3]. Value s1 corresponds to 1 second, value s2 corresponds to 2 seconds, and so on.<br>drx-Config<br>Used to configure DRX as specified in TS 38.321 [3].<br>drx-ConfigSecondaryGroup<br>Used to configure DRX related parameters for the second DRX group as specified in TS<br>38.321 [3]. The network does not configure secondary DRX group with DCP simultaneously<br>nor secondary DRX group with a dormant BWP simultaneously.<br>lch-BasedPrioritization<br>If this field is present, the corresponding MAC entity of the UE is configured with<br>prioritization between overlapping grants and between scheduling request and overlapping<br>grants based on LCH priority, see TS 38.321 [3].<br>schedulingRequestID-BFR-SCell<br>Indicates the scheduling request configuration applicable for BFR on SCell, as specified in TS<br>38.321 [3].<br>schedulingRequestID-LBT-SCell<br>Indicates the scheduling request configuration applicable for consistent uplink LBT recovery<br>on SCell, as specified in TS 38.321 [3].<br>schedulingRequestID-BFR-TRP<br>Indicates the scheduling request configuration applicable for TRP specific BFR, as<br>specified in TS 38.321 [3].<br>skipUplinkTxDynamic<br>If set to true, the UE skips UL transmissions as described in TS 38.321 [3].<br>tag-Config<br>The field is used to configure parameters for a time-alignment group. The field is not present<br>if any DAPS bearer is configured. |

TABLE 11

| schedulingRequestID-BFR-TRP field descriptions |
|---|
| coresetPoolIndex-r17<br>The index of the CORESET pool for which this scheduling request<br>configuration is applicable.<br>If the field is absent, the UE applies the value 0 |

For another example, an SR ID is configured and included in IE CellGroupConfig. As shown in Tables 12 to 14:

TABLE 12

| CellGroupConfig information element |
|---|

```
-- ASN1START
-- TAG-CELLGROUPCONFIG-START
-- Configuration of one Cell-Group:
CellGroupConfig ::=                SEQUENCE {
    cellGroupId                       CellGroupId,
    rlc-BearerToAddModList            SEQUENCE (SIZE(1..maxLC-ID)) OF RLC-
BearerConfig   OPTIONAL,    -- Need N
    rlc-BearerToReleaseList           SEQUENCE (SIZE(1..maxLC-ID)) OF
LogicalChannelIdentity                      OPTIONAL,   -- Need N
    mac-CellGroupConfig               MAC-CellGroupConfig
OPTIONAL,   -- Need M
    physicalCellGroupConfig                 PhysicalCellGroupConfig
OPTIONAL,   -- Need M
    spCellConfig                      SpCellConfig
OPTIONAL,   -- Need M
    sCellToAddModList                         SEQUENCE (SIZE (1..maxNrofSCells)) OF
SCellConfig                         OPTIONAL,   -- Need N
    sCellToReleaseList                SEQUENCE (SIZE (1..maxNrofSCells)) OF
SCellIndex                          OPTIONAL,   -- Need N
    ...,
    [[
    reportUplinkTxDirectCurrent       ENUMERATED {true}        OPTIONAL      -
- Cond BWP-Reconfig
    ]],
    [[
    bap-Address-r16                   BIT STRING (SIZE (10))
OPTIONAL,   -- Need M
    bh-RLC-ChannelToAddModList-r16                    SEQUENCE (SIZE(1..maxBH-
RLC-ChannelID-r16)) OF BH-RLC-ChannelConfig-r16 OPTIONAL,   -- Need N
    bh-RLC-ChannelToReleaseList-r16                    SEQUENCE (SIZE(1..maxBH-
RLC-ChannelID-r16)) OF BH-RLC-ChannelID-r16          OPTIONAL,   -- Need N
    f1c-TransferPath-r16              ENUMERATED {lte, nr, both}
OPTIONAL,   -- Need M
    simultaneousTCI-UpdateList1-r16              SEQUENCE (SIZE
(1..maxNrofServingCellsTCI-r16)) OF ServCellIndex               OPTIONAL, -- Need R
    simultaneousTCI-UpdateList2-r16              SEQUENCE (SIZE
(1..maxNrofServingCellsTCI-r16)) OF ServCellIndex               OPTIONAL, -- Need R
    simultaneousSpatial-UpdatedList1-r16         SEQUENCE (SIZE
(1..maxNrofServingCellsTCI-r16)) OF ServCellIndex               OPTIONAL, -- Need R
    simultaneousSpatial-UpdatedList2-r16         SEQUENCE (SIZE
(1..maxNrofServingCellsTCI-r16)) OF ServCellIndex               OPTIONAL, -- Need R
    uplinkTxSwitchingOption-r16       ENUMERATED {switchedUL, dualUL}
OPTIONAL,   -- Need R
    uplinkTxSwitchingPowerBoosting-r16                ENUMERATED {enabled}
OPTIONAL    -- Need R
    schedulingRequestID-BFR-TRP-r17           SchedulingRequestId-BFR-TRP
OPTIONAL,   -- Need R
    ]]
}
-- Serving cell specific MAC and PHY parameters for a SpCell:
SpCellConfig ::=                  SEQUENCE {
    servCellIndex                     ServCellIndex
OPTIONAL,   -- Cond SCG
    reconfigurationWithSync   ReconfigurationWithSync   OPTIONAL,   -- Cond
ReconfWith Sync
    rlf-TimersAndConstants            SetupRelease { RLF-TimersAndConstants }
OPTIONAL, -- Need M
    rlmInSyncOutOfSyncThreshold         ENUMERATED {n1}
OPTIONAL, -- Need S
    spCellConfigDedicated             ServingCellConfig
OPTIONAL, -- Need M
    ...
}
ReconfigurationWithSync ::=       SEQUENCE {
    spCellConfigCommon                      ServingCellConfigCommon
OPTIONAL,   -- Need M
    newUE-Identity                    RNTI-Value,
    t304                              ENUMERATED {ms50, ms100, ms150, ms200,
ms500, ms1000, ms2000, ms10000},
    rach-ConfigDedicated              CHOICE {
        uplink                            RACH-ConfigDedicated,
        supplementaryUplink               RACH-ConfigDedicated
    }
OPTIONAL,   -- Need N
    ...,
    [[
    smtc                              SSB-MTC
OPTIONAL   -- Need S
```

TABLE 12-continued

| CellGroupConfig information element |
|---|

```
    ]],
    [[
    daps-UplinkPowerConfig-r16      DAPS-UplinkPowerConfig-r16
OPTIONAL    -- Need N
    ]]
}
DAPS-UplinkPowerConfig-r16 ::=      SEQUENCE {
    p-DAPS-Source-r16                  P-Max,
    p-DAPS-Target-r16                  P-Max,
    uplinkPowerSharingDAPS-Mode-r16         ENUMERATED {semi-static-mode1, semi-
static-mode2, dynamic }
}
SCellConfig ::=               SEQUENCE {
    sCellIndex                    SCellIndex,
    sCellConfigCommon                    ServingCellConfigCommon   OPTIONAL,
-- Cond SCellAdd
    sCellConfigDedicated          ServingCellConfig                OPTIONAL,   --
Cond SCellAddMod
    ...,
    [[
    smtc                    SSB-MTC                    OPTIONAL
-- Need S
    ]],
    [[
    sCellState-r16               ENUMERATED {activated}   OPTIONAL,   --
Cond SCellAddSync
    secondaryDRX-GroupConfig-r16      ENUMERATED {true}                OPTIONAL
-- Cond DRX-Config2
    ]]}
SchedulingRequestId-BFR-TRP ::=   SEQUENCE {
    coresetPoolIndex-r17                INTEGER (0..1)
OPTIONAL,   -- Need R
    schedulingRequestId                SchedulingRequestId
}
-- TAG-CELLGROUPCONFIG-STOP
-- ASN1STOP
```

TABLE 13

| CellGroupConfig field descriptions |
|---| bap-Address
BAP address of the parent node in cell group.
bh-RLC-ChannelToAddModList
Configuration of the backhaul RLC entities and the corresponding MAC Logical Channels to
be added and modified.
bh-RLC-ChannelToReleaseList
List of the backhaul RLC entities and the corresponding MAC Logical Channels to be
released.
f1c-TransferPath
The F1-C transfer path that an EN-DC IAB-MT should use for transferring F1-C packets to
the IAB-donor-CU. If IAB-MT is configured with lte, IAB-MT can only use LTE leg for F1-
C transfer. If IAB-MT is configured with nr, IAB-MT can only use NR leg for F1-C transfer.
If IAB-MT is configured with both, it is up to IAB-MT to select an LTE leg or a NR leg for
F1-C transfer. If the field is not configured, the IAB node uses the NR leg as the default one.
mac-CellGroupConfig
MAC parameters applicable for the entire cell group.
rlc-BearerToAddModList
Configuration of the MAC Logical Channel, the corresponding RLC entities and association
with radio bearers.
reportUplinkTxDirectCurrent
Enables reporting of uplink and supplementary uplink Direct Current location information
upon BWP configuration and reconfiguration. This field is only present when the BWP
configuration is modified or any serving cell is added or removed. This field is absent in the
IE CellGroupConfig when provided as part of RRCSetup message. If UE is configured with
SUL carrier, UE reports both UL and SUL Direct Current locations.
rlmInSyncOutOfSyncThreshold
BLER threshold pair index for IS/OOS indication generation, see TS 38.133 [14], table 8.1.1-
1. n1 corresponds to the value 1. When the field is absent, the UE applies the value 0.
Whenever this is reconfigured, UE resets N310 and N311, and stops T310, if running. Network
does not include this field.
sCellState
Indicates whether the SCell shall be considered to be in activated state upon SCell
configuration.
sCellToAddModList TABLE 13-continued

| CellGroupConfig field descriptions |
| --- |

List of secondary serving cells (SCells) to be added or modified.
sCellToReleaseList
List of secondary serving cells (SCells) to be released.
schedulingRequestID-BFR-TRP
Indicates the scheduling request configuration applicable for TRP specific BFR, as
specified in TS 38.321 [3].
secondaryDRX-GroupConfig
The field is used to indicate whether the SCell belongs to the secondary DRX group. All
serving cells in the secondary DRX group shall belong to one Frequency Range and all serving
cells in the legacy DRX group shall belong to another Frequency Range.
simultaneousTCI-UpdateList1, simultaneousTCI-UpdateList2
List of serving cells which can be updated simultaneously for TCI relation with a MAC CE.
The simultaneousTCI-UpdateList1 and simultaneousTCI-UpdateList2 shall not contain same
serving cells. Network should not configure serving cells that are configured with a BWP with
two different values for the coresetPoolIndex in these lists.
simultaneousSpatial-UpdatedList1, simultaneousSpatial-UpdatedList2
List of serving cells which can be updated simultaneously for spatial relation with a MAC CE.
The simultaneousSpatial-UpdatedList1 and simultaneousSpatial-UpdatedList2 shall not
contain same serving cells. Network should not configure serving cells that are configured
with a BWP with two different values for the coresetPoolIndex in these lists.
spCellConfig
Parameters for the SpCell of this cell group (PCell of MCG or PSCell of SCG).
uplinkTxSwitchingOption
Indicates which option is configured for dynamic UL Tx switching for inter-band UL CA or
(NG)EN-DC. The field is set to switchedUL if network configures option 1 as specified in TS
38.214 [19], or dualUL if network configures option 2 as specified in TS 38.214 [19]. Network
always configures UE with a value for this field in inter-band UL CA case and (NG)EN-DC
case where UE supports dynamic UL Tx switching.
uplinkTxSwitchingPowerBoosting
Indicates whether the UE is allowed to enable 3dB boosting on the maximum output power
for transmission on carrier2 under the operation state in which 2-port transmission can be
supported on carrier2 for inter-band UL CA case with dynamic UL Tx switching as defined in
TS 38.101-1 [15]. Network can only configure this field for dynamic UL Tx switching in inter-
band UL CA case with power Class 3 as defined in TS 38.101-1 [15].

TABLE 14

| schedulingRequestID-BFR-TRP field descriptions |
| --- | coresetPoolIndex-r17
The index of the CORESET pool for which this scheduling request
configuration is applicable.
If the field is absent, the UE applies the value 0

In some embodiments, when an MAC entity of a terminal equipment has a pending SR for a TRP-specific BFR, and for an SR transmission occasion, the MAC entity has one or more PUCCH resources overlapping with PUCCH resources of the TRP-specific BFR, the MAC entity determines (deems) that the PUCCH resources of the TRP-specific BFR are valid.

In some embodiments, when an MAC entity of a terminal equipment has a pending SR for a secondary cell/TRP-specific BFR, and for an SR transmission occasion, the MAC entity has one or more PUCCH resources overlapping with PUCCH resources of the secondary cell/TRP-specific BFR, the MAC entity determines (deems) that the PUCCH resources of the secondary cell/TRP-specific BFR are valid.

For example, the MAC entity only deems that PUCCH resources of the secondary cell/TRP-specific BFR is valid. When the MAC entity has a pending SR for the secondary cell BFR and a pending SR for the TRP-specific BFR, and for the SR transmission occasion, the MAC entity has one or more PUCCH resources overlapping with PUCCH resources of the secondary cell BFR and/or PUCCH resources of the TRP-specific BFR, which PUCCH resource is valid depends on the implementation of the terminal equipment.

In some embodiments, in the case where the terminal equipment transmits an MAC PDU and the MAC PDU includes a beam failure recovery MAC CE or a truncated beam failure recovery MAC CE, the beam failure recovery MAC CE or the truncated beam failure recovery MAC CE includes beam failure information of a cell, the MAC entity of the terminal equipment cancels the pending SR triggered for the BFR of the TRP included in the cell and stops the respective prohibiting timer; e.g., sr-ProhibitTimer.

In some embodiments, in the case where the terminal equipment transmits an MAC PDU, and the MAC PDU includes an MAC CE that includes beam failure information of a TRP, the MAC entity of the terminal equipment cancels the pending SR triggered for the BFR of the TRP and stops the respective prohibiting timer; e.g., sr-ProhibitTimer.

In some embodiments, once a secondary cell is deactivated, the MAC entity of the terminal equipment cancels the pending SR triggered for the BFR of the TRP included in the secondary cell.

In some embodiments, if all TRP-specific BFRs that triggers SR are cancelled, the MAC entity of the terminal equipment cancels the triggered pending SR.

In some embodiments, upon SR resource reconfiguration, the MAC entity of the terminal equipment cancels the pending SR.

In some embodiments, in the case where an MAC PDU performs transmission using an uplink grant except an uplink grant provided by random access response (RAR) or an uplink grant determined from the transmission of the message A payload (MSGA payload), and the MAC PDU includes an MAC CE including beam failure information of a TRP, the MAC entity of the terminal equipment stops the ongoing random access procedure due to the pending SR by the BFR of the TRP.

The above embodiments merely exemplify the embodiments of the present application, but the present application is not limited thereto, and appropriate variants may be made on the basis of the above embodiments. For example, each of the above embodiments may be used alone or in combination with one or more of the above embodiments.

It can be known from the above embodiments, the MAC entity of the terminal equipment receives a beam failure instance indication, increments a transmission reception point (TRP)-specific beam failure indication count by 1, and in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered. Thus, not only beam failure detection at the TRP level can be triggered when only part of the beams fails, but also beam failure detection at the cell level or the TRP level can be distinguished, thereby avoiding resource waste.

Embodiments of the Second Aspect

An embodiment of the present application provides a method for detecting beam failure, which is described from a terminal equipment. The embodiments of the second aspect combine the TRP-specific beam failure detection and the cell-specific beam failure detection, and the same content as those of the embodiments of the first aspect is not repeated.

In some embodiments, the MAC entity of the terminal equipment determines whether the beam failure instance indication is cell specific or cell level; and in the case where the beam failure instance indication is not cell specific or cell level, starts or restarts a transmission reception point (TRP)-specific beam failure detection timer.

In some embodiments, the MAC entity of the terminal equipment determines whether the beam failure instance indication is TRP specific or TRP level; and in the case where the beam failure instance indication is TRP specific or TRP level, starts or restarts the transmission reception point (TRP)-specific beam failure detection timer.

Figure 9:
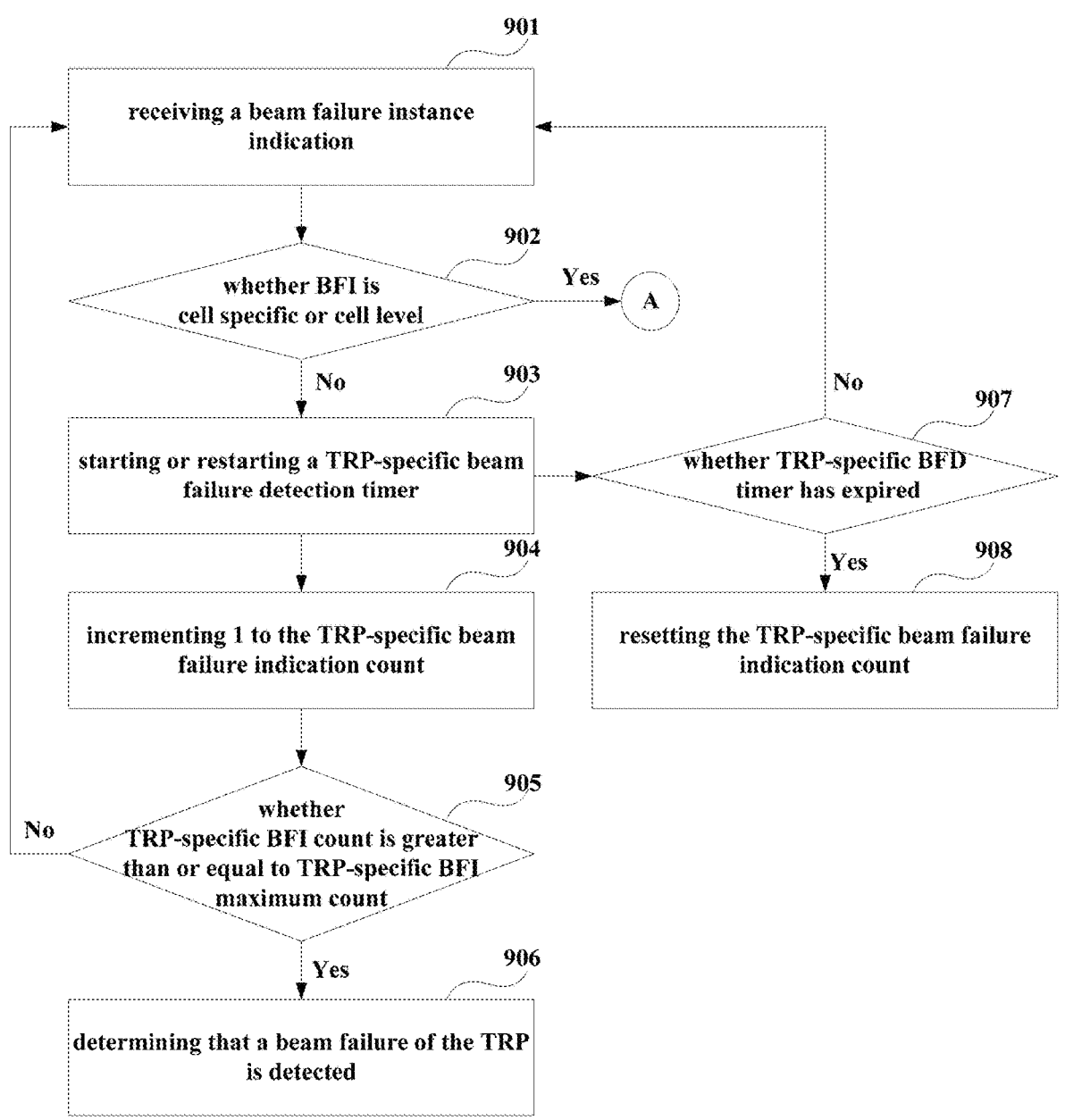
FIG. 9 is another schematic diagram of a method for detecting beam failure according to an embodiment of the present application.
Figure 10:
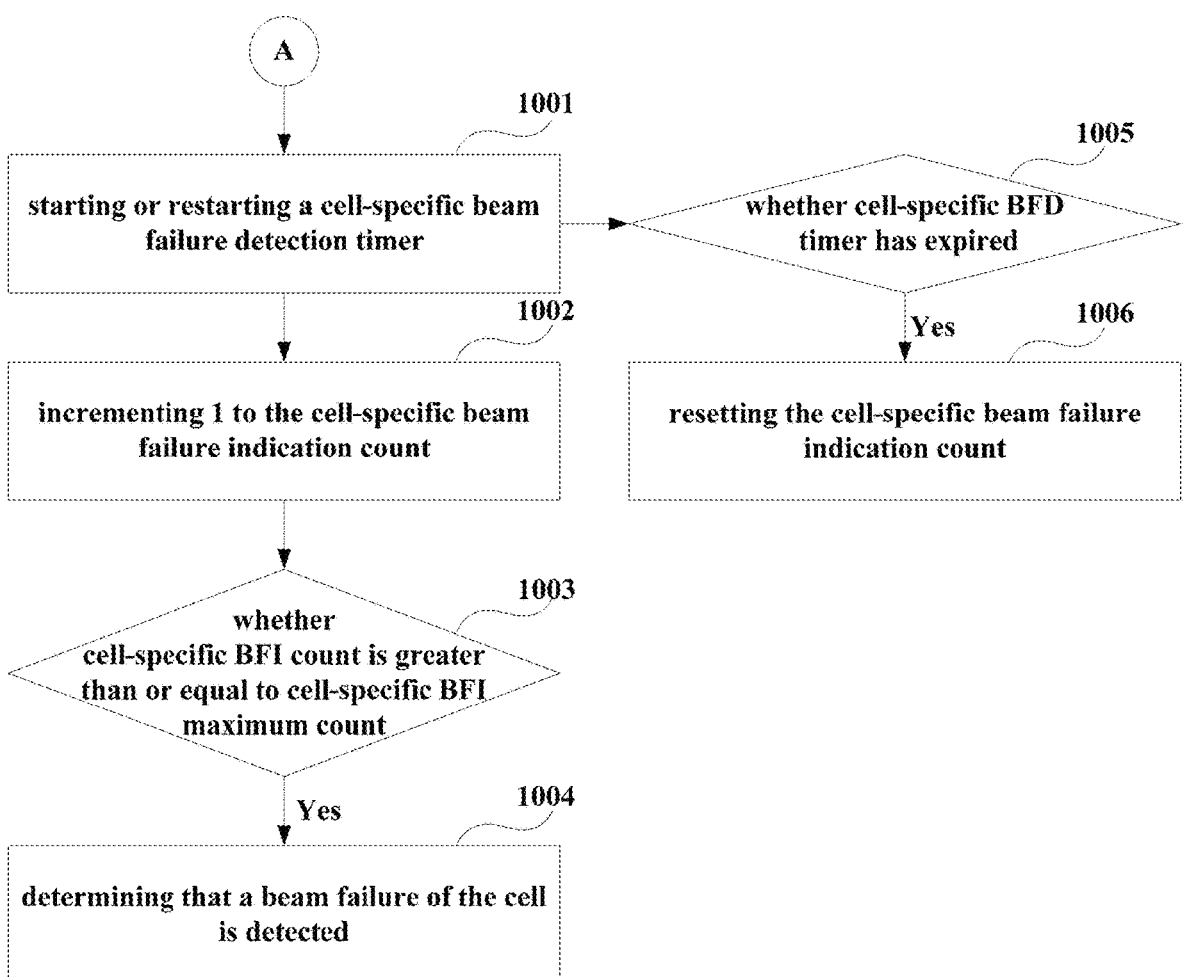
FIG. 10 is another schematic diagram of a method for detecting beam failure according to an embodiment of the present application.

FIG. 9 is another schematic diagram of a method for detecting beam failure according to an embodiment of the present application, schematically illustrating an operation of an MAC entity of a terminal equipment. As shown in FIG. 9, the operation of the MAC entity includes:

901, receiving a beam failure instance indication from a lower layer;

902, determining whether the beam failure instance indication is cell specific or cell level; and performing 903 in the case where the beam failure instance indication is not cell specific or cell level, otherwise jumping to A, and performing the operation of FIG. 10;

903, starting or restarting a transmission reception point (TRP)-specific beam failure detection timer (e.g., beamFailure Detection Timer-per TRP);

904, incrementing 1 to the TRP-specific beam failure indication count associated with the TRP-specific beam failure detection timer (e.g., beamFailure Detection Timer-per TRP);

905, determining whether the TRP-specific beam failure indication count (e.g., BFI_COUNTER-perTRP) is greater than or equal to the TRP-specific beam failure instance maximum count (e.g., beamFailureInstanceMaxCount-per TRP); and

906, in a case where the TRP-specific beam failure indication count (e.g., BFI_COUNTER-per TRP) is greater than or equal to the TRP-specific beam failure instance maximum count (e.g., beam FailureInstanceMaxCount-perTRP), determining that a beam failure of the TRP is detected or a beam failure recovery (BFR) of the TRP is triggered or a beam failure indication of the TRP is triggered.

As shown in FIG. 9, the operation of the MAC entity further includes:

907, determining whether the TRP-specific beam failure detection timer (e.g., beam Failure Detection Timer-per TRP) has expired; and

908, resetting the TRP-specific beam failure indication count (e.g., BFI_COUNTER-per TRP) or setting the TRP-specific beam failure indication count (e.g., BFI_COUNTER-per TRP) to 0 in the case where the TRP-specific beam failure detection timer has expired.

It should be noted that FIG. 9 only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 9 described above.

FIG. 10 is another schematic diagram of a method for detecting beam failure according to an embodiment of the present application, schematically illustrating an operation of an MAC entity of a terminal equipment. As shown in FIG. 10, the operation of the MAC entity includes:

1001, starting or restarting a cell-specific beam failure detection timer (e.g., beam Failure Detection Timer-perCell or beamFailure Detection Timer);

1002, incrementing 1 to the cell-specific beam failure indication count (e.g., FI_COUNTER-perCell or BFI_COUNTER) associated with the cell-specific beam failure detection timer (e.g., beam Failure Detection Timer-perCell or beamFailure Detection Timer);

1003, determining whether the cell-specific beam failure indication count (e.g., BFI_COUNTER-perCell or BFI_COUNTER) is greater than or equal to the cell-specific beam (e.g., beamFailure InstanceMaxCount-perCell or failure instance maximum count beamFailInstanceMaxCount); and

1004, in a case where the cell-specific beam failure indication count (e.g., BFI_COUNTER-perCell or BFI_COUNTER) is greater than or equal to the cell-specific beam failure instance maximum count (e.g., beamFailure Instance MaxCount-perCell or beam Failure InstanceMaxCount), determining that a beam failure of the cell is detected or a beam failure recovery (BFR) of the cell is triggered or a beam failure indication of the cell is triggered.

As shown in FIG. 10, the operation of the MAC entity further includes:

1005, determining whether the cell-specific beam failure detection timer (e.g., beam Failure Detection Timer-perCell or beamFailureDetectionTimer) has expired; and

1006, resetting the cell-specific beam failure indication count (e.g., BFI_COUNTER-perCell or BFI_ COUNTER) or setting the cell-specific beam failure indication count (e.g., BFI_COUNTER-perCell or BFI_ COUNTER) to 0 in the case where the cell-specific beam failure detection timer has expired.

It should be noted that FIG. 10 only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 10 described above.

Figure 11A:
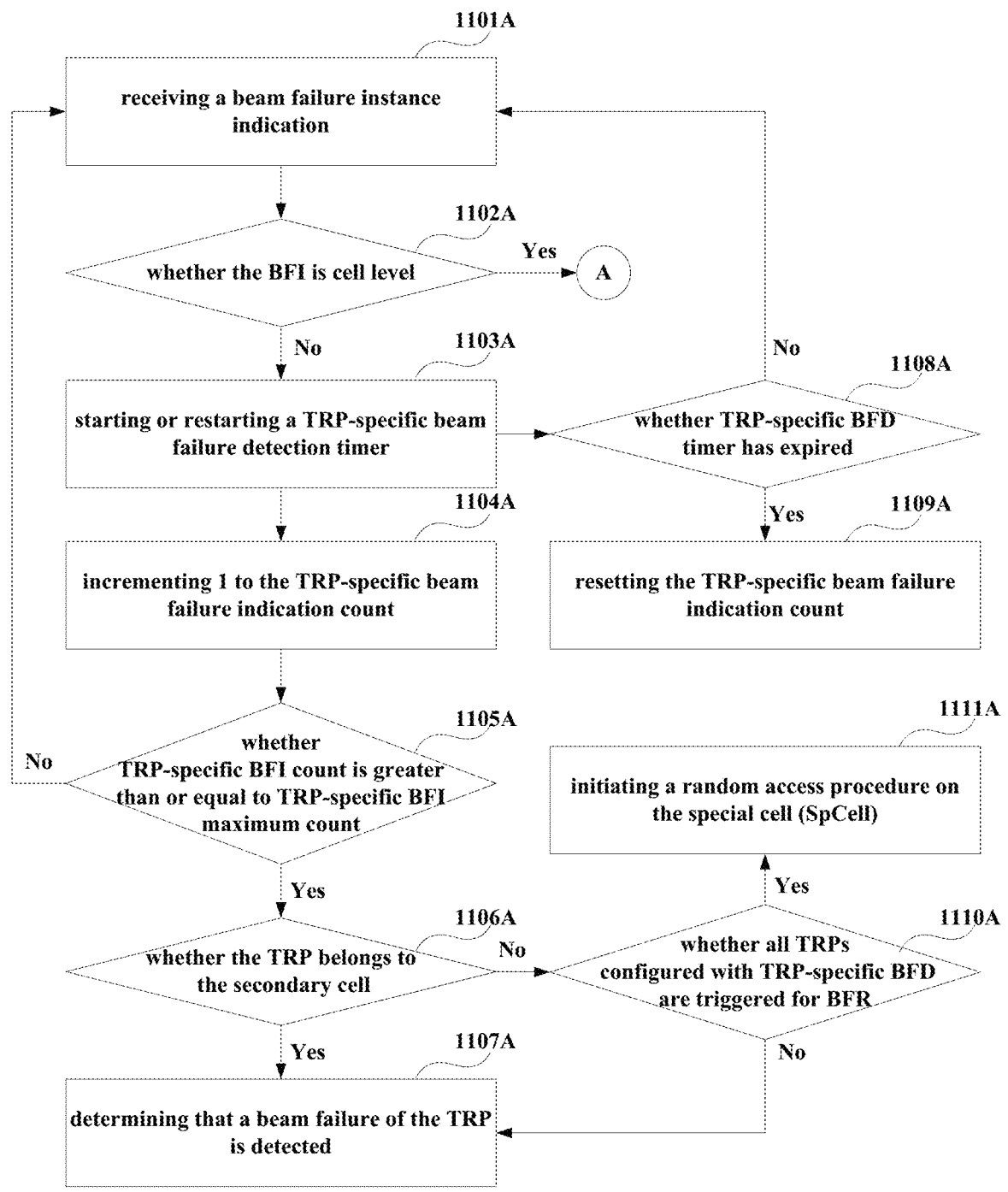
FIG. 11A is another schematic diagram of a method for detecting beam failure according to an embodiment of the present application.

FIG. 11A is another schematic diagram of a method for detecting beam failure according to an embodiment of the present application, schematically illustrating an operation of an MAC entity of a terminal equipment. As shown in FIG. 11A, the operation of the MAC entity includes:

1101A, receiving a beam failure instance indication from a lower layer;

1102A, determining whether the beam failure instance indication is cell specific or cell level; and performing 1103A in the case where the beam failure instance indication is not cell specific or cell level, otherwise jumping to A, and performing the operation of FIG. 10;

1103A, starting or restarting a transmission reception point (TRP)-specific beam failure detection timer (e.g., beamFailure Detection Timer-per TRP);

1104A, incrementing 1 to the TRP-specific beam failure indication count (e.g. BFI_COUNTER-perTRP) associated with the TRP-specific beam failure detection timer (e.g., beam Failure Detection Timer-per TRP);

1105A, determining whether the TRP-specific beam failure indication count (e.g., BFI_COUNTER-perTRP) is greater than or equal to the TRP-specific beam failure instance maximum count (e.g., beamFailureInstanceMaxCount-perTRP); and performing 1106A if the TRP-specific beam failure indication count (e.g., BFI_COUNTER-perTRP) is greater than or equal to the TRP-specific beam failure instance maximum count (e.g., beamFailure InstanceMaxCount-perTRP);

1106A, determining whether the TRP belongs to the secondary cell (SCell); and performing 1107A if the TRP belongs to the secondary cell (SCell) and performing 1110A if the TRP does not belong to the secondary cell (SCell);

1107A, determining that a beam failure of the TRP is detected or a beam failure recovery (BFR) of the TRP is triggered or a beam failure indication of the TRP is triggered.

As shown in FIG. 11A, the operation of the MAC entity further includes:

1108A, determining whether the TRP-specific beam failure detection timer (e.g., beamFailureDetectionTimer-per TRP) has expired; and performing 1109A in the case where the TRP-specific beam failure detection timer has expired;

1109A, resetting the TRP-specific beam failure indication count (e.g., BFI_COUNTER-per TRP) or setting the TRP-specific beam failure indication count (e.g., BFI_COUNTER-perTRP) to 0.

As shown in FIG. 11A, the operation of the MAC entity further includes:

1110A, determining whether all TRPs configured with TRP-specific beam failure detection are triggered for beam failure recovery; performing 1111A in the case where all TRPs configured with TRP-specific beam failure detection are triggered for beam failure recovery, otherwise performing 1107A;

1111A, initiating a random access procedure on the special cell (SpCell).

It should be noted that FIG. 11A only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 11A described above.

Figure 11B:
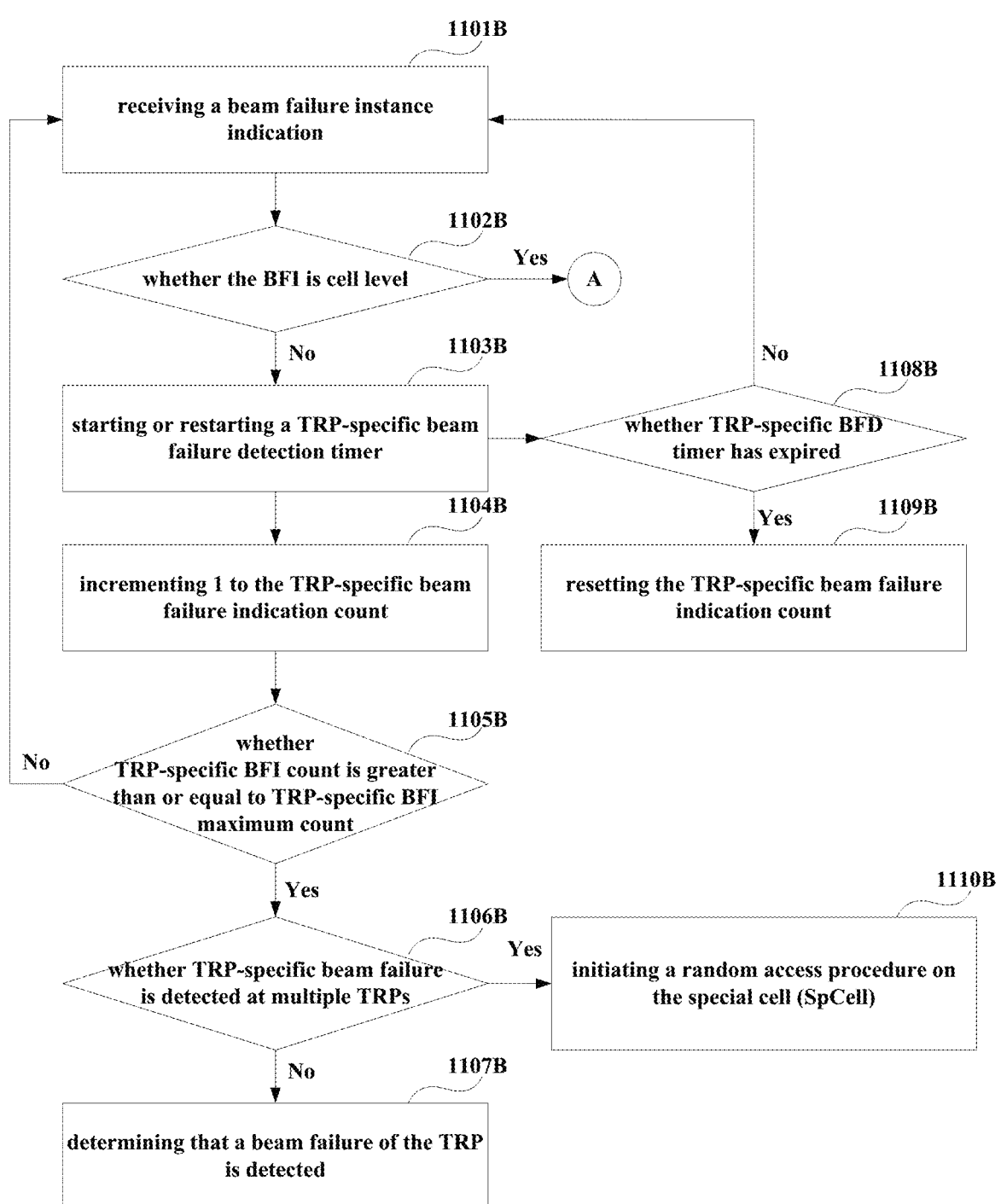
FIG. 11B is another schematic diagram of a method for detecting beam failure according to an embodiment of the present application.

FIG. 11B is another schematic diagram of a method for detecting beam failure according to an embodiment of the present application, schematically illustrating an operation of an MAC entity of a terminal equipment. As shown in FIG. 11B, the operation of the MAC entity includes:

1101B, receiving a beam failure instance indication from a lower layer;

1102B, determining whether the beam failure instance indication is cell specific or cell level; and performing 1103B in the case where the beam failure instance indication is not cell specific or cell level, otherwise jumping to A, and performing the operation of FIG. 10;

1103B, starting or restarting a transmission reception point (TRP)-specific beam failure detection timer (e.g., beamFailure Detection Timer-per TRP);

1104B, incrementing 1 to the TRP-specific beam failure indication count (e.g. BFI_COUNTER-perTRP) associated with the TRP-specific beam failure detection timer (e.g., beamFailureDetectionTimer-per TRP);

1105B, determining whether the TRP-specific beam failure indication count (e.g., BFI_COUNTER-perTRP) is greater than or equal to the TRP-specific beam failure instance maximum count (e.g., beamFailureInstanceMaxCount-perTRP); and performing 1106B if the TRP-specific beam failure indication count (e.g., BFI_COUNTER-perTRP) is greater than or equal to the TRP-specific beam failure instance maximum count (e.g., beamFailureInstance MaxCount-per TRP);

1106B, determining whether the TRP-specific beam failure is detected or TRP-specific BFR is triggered at multiple TRPs; and performing 1107B if not, and performing 1110B if yes;

The multiple TRPs include all TRPs configured with TRP-specific beam failure detection of all serving cells in the MAC entity, or all TRPs configured with TRP-specific beam failure detection of a special cell in the MAC entity.

1107B, determining that a beam failure of the TRP is detected or a beam failure recovery (BFR) of the TRP is triggered or a beam failure indication of the TRP is triggered.

As shown in FIG. 11B, the operation of the MAC entity further includes:

1108B, determining whether the TRP-specific beam failure detection timer (e.g., beamFailure Detection Timer-per TRP) has expired; and performing 1109B in the case where the TRP-specific beam failure detection timer has expired;

1109B, resetting the TRP-specific beam failure indication count (e.g., BFI_COUNTER-per TRP) or setting the TRP-specific beam failure indication count (e.g., BFI_COUNTER-perTRP) to 0.

As shown in FIG. 11B, the operation of the MAC entity further includes:

1110B, initiating a random access procedure on the special cell (SpCell).

It should be noted that FIG. 11B only schematically illustrates the embodiment of the present application, but the present application is not limited thereto. For example, the execution order between the operations may be appropriately adjusted, and some other operations may be added or some of the operations may be reduced. And appropriate variants may be made by those skilled in the art according to the above contents, which are not limited to the description of FIG. 11B described above.

In some embodiments, as long as a TRP-specific BFR is configured, a cell-specific BFD on a specific cell should be configured, or a cell-specific BFD on a belonging cell should be configured or a cell-specific BFD on at least one cell should be configured.

The above embodiments merely exemplify the embodiments of the present application, but the present application is not limited thereto, and appropriate variants may be made on the basis of the above embodiments. For example, each of the above embodiments may be used alone or in combination with one or more of the above embodiments.

It can be known from the above embodiments, the MAC entity of the terminal equipment receives a beam failure instance indication, increments a transmission reception point (TRP)-specific beam failure indication count by 1, and in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered. Thus, not only beam failure detection at the TRP level can be triggered when only part of the beams fails, but also beam failure detection at the cell level or the TRP level can be distinguished, thereby avoiding resource waste.

Embodiments of the Third Aspect

The following description is based on the embodiments of the first and second aspects, and the same contents as the embodiments of the first and second aspects are not repeated. The embodiments of the third aspect may be performed separately or in combination with the embodiments of the first and second aspects; and in addition, the embodiments of the third aspect may be applicable to TRP-specific BFR/BFD as well as cell-specific BFR/BFD, such as Rel-16 BFR/BFD.

In some embodiments, a medium access control (MAC) entity of a terminal equipment detects that a beam failure occurs in a transmission reception point or a cell, or that the beam failure recovery (BFR) of the transmission reception point or the cell is triggered, or that beam failure indication of the transmission reception point or the cell is triggered;

and the MAC entity of the terminal equipment instructs the multiplexing and assembly entity to generate a beam failure recovery MAC CE or a beam failure MAC CE.

In some embodiments, the MAC entity of the terminal equipment determines whether the evaluation of the candidate beam is completed when the candidate beam is configured. For example, completion of subsequent beam evaluation is considered only when candidate beams are configured and the MAC entity indicates generation (Truncated) BFR MAC CE.

In some embodiment, if the beam failure recovery procedure determines that at least one beam failure recovery has been triggered and is not cancelled, or a beam failure is detected, or at least one beam failure indication is triggered and is not cancelled, and if a candidate beam list is configured and evaluation of at least one reference signal in the candidate beam list has been completed, the MAC entity of the terminal equipment instructs the multiplexing and assemble entity to generate the beam failure recovery MAC CE or the beam failure MAC CE.

For example:

if the beam failure recovery procedure determines that at least one beam failure recovery has been triggered and is not cancelled, or a beam failure is detected, or at least one beam failure indication is triggered and is not cancelled, if a candidate beam is configured and evaluation of the candidate beam has been completed, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for beam failure recovery or beam failure is triggered for each cell or TRP for which a BFR is triggered and not cancelled if a candidate beam is configured and evaluation of the candidate beam has been completed.

For example, as described in Table 15 below:

TABLE 15

The MAC entity shall:
1>if the Beam Failure Recovery procedure determines that at least one BFR has been triggered and not cancelled for an SCell for which evaluation of the candidate beams, if configured, according to the requirements as specified in TS 38.133 [11] has been completed:
  2>if UL-SCH resources are available for a new transmission and if the UL-SCH resources can accommodate the BFR MAC CE plus its subheader as a result of LCP:
    3>instruct the Multiplexing and Assembly procedure to generate the BFR MAC CE.
  2>else if UL-SCH resources are available for a new transmission and if the UL-SCH resources can accommodate the Truncated BFR MAC CE plus its subheader as a result of LCP:
    3>instruct the Multiplexing and Assembly procedure to generate the Truncated BFR MAC CE.
  2>else:
    3>trigger the SR for SCell beam failure recovery for each SCell for which BFR has been triggered, not cancelled, and for which evaluation of the candidate beams according to the requirements as specified in TS 38.133 [11] has been completed.

In some embodiments, if the beam failure recovery procedure determines that at least one beam failure recovery has been triggered and is not cancelled, or a beam failure is detected, or at least one beam failure indication is triggered and is not cancelled, and if a candidate beam is not configured, the MAC entity of the terminal equipment does not determine whether the evaluation of the candidate beam is completed.

For example:

if the beam failure recovery procedure determines that at least one beam failure recovery has been triggered and is not cancelled, or a beam failure is detected, or at least one beam failure indication is triggered and is not cancelled, if a candidate beam is configured and evaluation of the candidate beam has been completed, or a candidate beam is not configured, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for the beam failure recovery or the beam failure is triggered for each cell or TRP that has triggered BFR and has not been cancelled.

For example, as described in Table 16 below:

TABLE 16

The MAC entity shall:
　1>if the Beam Failure Recovery procedure determines that at least one BFR has been triggered and not cancelled for an SCell:
　　2>if at least one candidate beam is configured, and if evaluation of the candidate beams according to the requirements as specified in TS 38.133 [11] has been completed for the BFR; or
　　2> if candidate beam is not configured:
　　　3> if UL-SCH resources are available for a new transmission and if the UL-SCH resources can accommodate the BFR MAC CE plus its subheader as a result of LCP:
　　　　4> instruct the Multiplexing and Assembly procedure to generate the BFR MAC CE.
　　　3>else if UL-SCH resources are available for a new transmission and if the UL-SCH resources can accommodate the Truncated BFR MAC CE plus its subheader as a result of LCP:
　　　　4> instruct the Multiplexing and Assembly procedure to generate the Truncated BFR MAC CE.
　　　3> else:
　　　　4> trigger the SR for SCell beam failure recovery for each SCell for which BFR has been triggered, not cancelled, and for which evaluation of the candidate beams according to the requirements as specified in TS 38.133 [11] has been completed.

In some embodiments, the MAC entity of the terminal equipment determines that the evaluation of the candidate beam has been completed if the candidate beam is not configured in the case where at least one beam failure recovery is triggered.

For example, as described in Table 17 below:

TABLE 17

The MAC entity shall for each Serving Cell configured for beam failure detection:
　1>if beam failure instance indication has been received from lower layers:
　　2>start or restart the beamFailureDetectionTimer;
　　2>increment BFI_COUNTER by 1;
　　2>if BFI_COUNTER >= beamFailureInstanceMaxCount:
　　　3>if the Serving Cell is SCell:
　　　　4>trigger a BFR for this Serving Cell;
　　　　4> if candidateBeamRSSCellList-r16 is not configured
　　　　5> consider evaluation of the candidate beams according to the requirements as specified in TS 38.133 has been completed without any periodic CSI-RS configuration index or SS/PBCH block index
　　　3>else:
　　　　4> initiate a Random Access procedure (see clause 5.1) on the SpCell.

In some embodiments, the physical layer of the terminal equipment, upon receiving the higher layer request, determines that the evaluation of the candidate beam has been completed in the case where the candidate beam is not configured.

For example, as described in Table 18 below:

TABLE 18

For the PCell or the PSCell, upon request from higher layers, the UE provides to higher layers the periodic CSI-RS configuration indexes and/or SS/PBCH block indexes from the set $\overline{q}_1$, if configured and the corresponding L1-RSRP measurements that are larger than or equal to the $Q_{in,\ LR}$ threshold or the UE indicates that evaluation of the candidate beams according to the requirements as specified in TS 38.133 has been completed without any periodic CSI-RS configuration index or SS/PBCH block index if the set $\overline{q}_1$ is not configured.
For the SCell, upon request from higher layers, the UE indicates to higher layers that evaluation of the candidate beams according to the requirements as specified in TS 38.133 has been completed without any periodic CSI-RS configuration index or SS/PBCH block index if the set $\overline{q}_1$ is not configured or whether there is at least one periodic CSI-RS configuration index and/or SS/PBCH block index from the set $\overline{q}_1$, if configured, with corresponding L1-RSRP measurements that are larger than or equal to the $Q_{in,\ LR}$ threshold, and provides the periodic CSI-RS configuration indexes and/or SS/PBCH block indexes from the set $\overline{q}_1$ and the corresponding L1-RSRP measurements that are larger than or equal to the $Q_{in,\ LR}$ threshold, if any.

In some embodiments, in a case where a reference signal for beam failure detection is configured, a candidate reference signal is configured. For example, if a reference signal for beam failure detection is configured, a candidate reference signal should be configured. For example, as described in Tables 19 to 21 below:

TABLE 19

BeamFailureRecoverySCellConfig
The IE BeamFailureRecoverySCellConfig is used to configure the UE with candidate beams for beam failure recovery in case of beam failure detection in SCell. See also TS 38.321 [3], clause 5.x.x.
BeamFailureRecoverySCellConfig information element

```
-- ASN1START
-- TAG-BEAMFAILURERECOVERYSCELLCONFIG-START
BeamFailureRecoverySCellConfig-r16 ::= SEQUENCE {
      rsrp-ThresholdBFR-r16                    RSRP-Range
OPTIONAL, -- Need M
      candidateBeamRSSCellList-r16             SEQUENCE
(SIZE(1..maxNrofCandidateBeams-r16)) OF CandidateBeamRS-r16       OPTIONAL, --
Cond BFD-RS
      ...
}
CandidateBeamRS-r16 ::=                  SEQUENCE {
      candidateBeamConfig-r16                  CHOICE {
          ssb-r16                                SSB-Index,
          csi-RS-r16                             NZP-CSI-RS-ResourceId
      },
      servingCellId                        ServCellIndex
OPTIONAL   -- Need R
}
-- TAG-BEAMFAILURERECOVERYSCELLCONFIG-STOP
-- ASN1STOP
```

50

TABLE 20

BeamFailureRecoverySCellConfig field descriptions candidateBeamConfig
Indicates the resource (i.e. SSB or CSI-RS) defining this beam resource.
candidateBeamRSSCellList
A list of reference signals (CSI-RS and/or SSB) identifying the candidate beams for recovery. The network always configures this parameter in every instance of this IE.
rsrp-ThresholdBFR
L1-RSRP threshold used for determining whether a candidate beam may be included by the UE be in BFR MAC CE (see TS 38.213 [13], clause X). The network always configures this parameter in every instance of this IE.
servingCellId
If the field is absent, the RS belongs to the serving cell in which this BeamFailureSCellRecoveryConfig is configured

TABLE 21

| Conditional Presence | Explanation |
| --- | --- |
| BFD-RS | The field is mandatory present if the radioLinkMonitoringRS-Id associated purpose is "beamFailure" or "both" is configured in the RadioLinkMonitoringConfig; else, the field is absent. |

In some embodiments, for each cell/TRP configured with beam failure recovery or with beam failure recovery parameters, and/or configured with beam failure detection or with beam failure detection parameters, the MAC entity will determine whether to instruct generation of an MAC CE or trigger an SR.

For example, for each cell/TRP configured with beam failure recovery or with beam failure recovery parameters, and/or configured with beam failure detection or with beam failure detection parameters, the MAC entity will, if the beam failure recovery procedure determines that at least one beam failure recovery has been triggered and is not cancelled, or a beam failure is detected, or at least one beam failure indication is triggered and is not cancelled, and evaluation of the candidate beam has been completed, If the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

Otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

Otherwise, a scheduling request (SR) for the beam failure recovery or the beam failure is triggered for each cell or TRP that has triggered BFR and has not been cancelled.

In some embodiments, for each cell/TRP configured with beam failure recovery or with beam failure recovery parameters, and/or configured with beam failure detection or with beam failure detection parameters, the MAC entity will perform beam failure detection to trigger the BFR.

For example, a cell-specific beam failure detection is taken as an example:

for each serving cell configured with beam failure detection (or configured with beam failure detection parameters), and/or configured with beam failure recovery (or configured with beam failure recovery parameters), the MAC entity will:

if a beam failure instance indication has been received from the lower layer:

start or restart the beam failure detection timer beamFailure Detection Timer;

increment 1 to the UE variable BFI_COUNTER;

if BFI_COUNTER is greater than or equal to the beam failure instance maximum count value beamFailureInstanceMax Count:

trigger a BFR for this serving cell if the serving cell is a secondary cell (SCell);

otherwise, initiate a random access procedure on this special cell (SpCell).

For another example, a cell-specific beam failure detection is taken as an example:

for each serving cell configured with beam failure detection (or configured with beam failure detection parameters), and/or configured with beam failure recovery (or configured with beam failure recovery parameters), the MAC entity will:

if a beam failure instance indication has been received from the lower layer:

start or restart the beam failure detection timer beamFailureDetectionTimer perTRP;

increment 1 to the UE variable BFI_COUNTER_perTRP;

if BFI_COUNTER_perTRP is greater than or equal to the beam failure instance maximum count value beamFailure InstanceMaxCount perTRP:

trigger a BFR of the TRP if the TRP belongs to a secondary cell (SCell), or all other TRPs of the serving cell that are configured with the TRP-specific beam failure detection are not triggered BFR;

otherwise, initiate a random access procedure on this special cell (SpCell).

The operation of the MAC entity is schematically described above, and embodiments of the present application are not limited thereto. Furthermore, the beam failure recovery parameters described above may be replaced with specific parameters, such as one or more of the following parameters:

BeamFailureRecoveryConfig,
BeamFailureRecoverySCellConfig,
BeamFailureRecoveryConfig-TRP,
candidateBeamRSList,
candidateBeamRSSCellList,
candidateBeamRSList-TRP.

The above embodiments merely exemplify the embodiments of the present application, but the present application is not limited thereto, and appropriate variants may be made on the basis of the above embodiments. For example, each of the above embodiments may be used alone or in combination with one or more of the above embodiments.

Embodiments of the Fourth Aspect

The embodiments of the present application provide an apparatus for detecting beam failure. The apparatus may be, for example, a terminal device or may be a certain or some parts or components configured in the terminal device, and the same content as the embodiments of the first to third aspects will not be described in detail.

Figure 12:
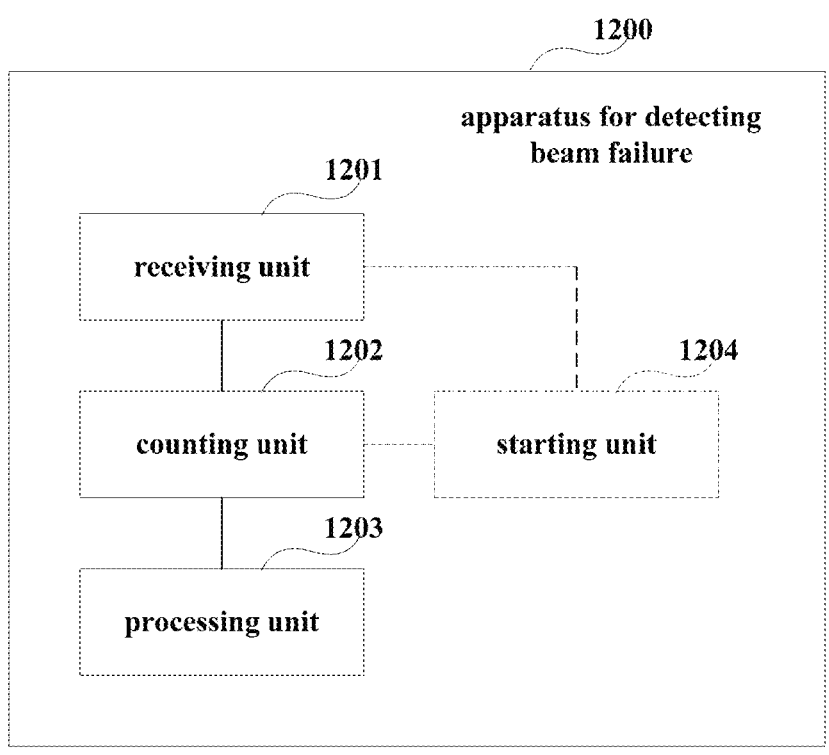
FIG. 12 is a schematic diagram of an apparatus for detecting beam failure according to an embodiment of the present application.

FIG. 12 is a schematic diagram of an apparatus for detecting beam failure according to an embodiment of the present application. As shown in FIG. 12, the apparatus 1200 for detecting beam failure includes:

a receiving unit 1201 configured to receive a beam failure instance indication by a medium access control (MAC) entity;

a counting unit 1202 configured to increment a TRP-specific beam failure indication count by 1; and a processing unit 1203 configured to, in a case where the TRP-specific beam failure indication count is greater than or equal to a TRP-specific beam failure instance maximum count, determine that a beam failure occurs in a transmission reception point or beam failure recovery (BFR) of the transmission reception point is triggered or a beam failure indication of the transmission reception point is triggered.

In some embodiments, as shown in FIG. 12, the apparatus 1200 for detecting beam failure further includes:

a starting unit 1204 configured to start or restart a transmission reception point (TRP)-specific beam failure detection timer when the medium access control entity receives a beam failure instance indication;

reset the TRP-specific beam failure indication count or set the TRP-specific beam failure indication count to 0 in the case where the TRP-specific beam failure detection timer has expired.

In some embodiments, the MAC entity of the terminal equipment instructs the multiplexing and assembly entity to generate a TRP-specific beam failure recovery MAC CE or a TRP-specific beam failure MAC CE.

In some embodiments, the MAC entity of the terminal equipment determines whether the evaluation of the candidate beam is completed when the candidate beam is configured.

In some embodiment, if the beam failure recovery procedure determines that at least one beam failure recovery has been triggered and is not cancelled, or a beam failure is detected, or at least one beam failure indication is triggered and is not cancelled, and if a candidate beam list is configured and evaluation of at least one reference signal in the candidate beam list has been completed, the MAC entity of the terminal equipment instructs the multiplexing and assemble entity to generate the TRP-specific beam failure recovery MAC CE or the TRP-specific beam failure MAC CE.

For example:

if the beam failure recovery procedure determines that at least one beam failure recovery has been triggered and is not cancelled, or a beam failure is detected, or at least one beam failure indication is triggered and is not cancelled, and if a candidate beam is configured and evaluation of the candidate beam has been completed, if the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

otherwise, a scheduling request (SR) for the TRP-specific beam failure recovery or the TRP-specific beam failure is triggered for each TRP that has triggered a BFR and has not been cancelled.

In some embodiments, if the beam failure recovery procedure determines that at least one beam failure recovery has been triggered and is not cancelled, or a beam failure is detected, or at least one beam failure indication is triggered and is not cancelled, and if a candidate beam list is not configured, the MAC entity of the terminal equipment does not determine whether the evaluation of the candidate beam is completed.

For example:

if the beam failure recovery procedure determines that at least one beam failure recovery has been triggered and is not cancelled, or a beam failure is detected, or at least one beam failure indication is triggered and is not cancelled, if a candidate beam is configured and evaluation of the candidate beam has been completed, or if a candidate beam is not configured, if the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

otherwise, a scheduling request (SR) for the TRP-specific beam failure recovery or the TRP-specific beam failure is triggered for each TRP that has triggered a BFR and has not been cancelled.

For another example, if the beam failure recovery procedure determines that at least one beam failure recovery has been triggered and is not cancelled, or a beam failure is detected, or at least one beam failure indication is triggered and is not cancelled, if a candidate beam is not configured, if the uplink resource is available for a new transmission and if the uplink resource can accommodate a beam failure recovery MAC CE or a beam failure MAC CE plus its sub-header as a result of LCP, the MAC entity instructs the multiplexing and assembly procedure to generate the beam failure recovery MAC CE or the beam failure MAC CE;

otherwise, if the uplink resource is available for a new transmission and if the uplink resource can accommodate a truncated beam failure recovery MAC CE or a beam failure MAC CE plus its sub-header as a result of LCP, the MAC entity instructs the multiplexing and assembly entity to generate the truncated beam failure recovery MAC CE or the beam failure MAC CE;

otherwise, a scheduling request (SR) for the TRP-specific beam failure recovery or the TRP-specific beam failure is triggered for each TRP that has triggered a BFR and has not been cancelled.

In some embodiments, the MAC entity of the terminal equipment determines that the evaluation of the candidate beam has been completed if the candidate beam is not configured in the case where at least one beam failure recovery is triggered.

In some embodiments, the physical layer of the terminal equipment, upon receiving the higher layer request, determines that the evaluation of the candidate beam has been completed in the case where the candidate beam is not configured.

In some embodiments, in a case where a reference signal for beam failure detection is configured, a candidate reference signal is configured.

In some embodiments, some or all of the serving cells in the MAC entity of the terminal equipment are configure with TRP-specific beam failure detection, and/or, a special cell in the MAC entity of the terminal equipment is configured with the TRP-specific beam failure detection.

In some embodiments, all of the serving cells in the MAC entity of the terminal equipment do not configured with cell-specific beam failure detection, or, a special cell in the MAC entity of the terminal equipment does not configured with the cell-specific beam failure detection. In a case where TRP-specific beam failure is detected or TRP-specific beam failure recovery is triggered at multiple TRPs, the MAC entity of the terminal equipment initiates a random access procedure in the special cell.

The multiple TRPs include all TRPs configured with TRP-specific beam failure detection of all serving cells in an MAC entity, or all TRPs configured with TRP-specific beam failure detection of a special cell in an MAC entity.

In some embodiments, the MAC entity of the terminal equipment determines whether the transmission reception point belongs to a secondary cell; and in a case where the transmission reception point belongs to a secondary cell, determines that a beam failure occurs in the transmission reception point or beam failure recovery of the transmission reception point is triggered or a beam failure indication of the transmission reception point is triggered.

In some embodiments, the MAC entity of the terminal equipment determines whether all TRPs configured with TRP-specific beam failure detection are triggered for beam failure recovery; in the case where all TRPs configured with TRP-specific beam failure detection are triggered for beam failure recovery, the MAC entity of the terminal equipment initiates a random access procedure in the special cell.

In some embodiments, the terminal equipment performs one or any combination of the following:

in the case where the terminal equipment transmits an MAC PDU and the MAC PDU includes a TRP-specific beam failure recovery MAC CE or a TRP-specific beam failure MAC CE, the terminal equipment cancels all of the beam failure recovery triggered for the TRPs before assembly of the MAC PDU;

or in the case where the terminal equipment transmits an MAC PDU, and the MAC PDU includes a beam failure recovery MAC CE or a truncated beam failure recovery MAC CE, and the MAC CE includes beam failure information of a cell, the MAC entity of the terminal equipment cancels all of the beam failure recovery triggered for all TRPs included in the cell before assembly of the MAC PDU;

or if a PDCCH addressed by the C-RNTI indicates receipt of uplink grant for a new transmission of a HARQ process for transmission including a TRP-specific beam failure recovery MAC CE or a TRP-specific beam failure MAC CE, the MAC entity of the terminal equipment cancels all beam failure recovery triggered for the TRP;

or if a PDCCH addressed by the C-RNTI indicates receipt of uplink grant for a new transmission of a HARQ process for transmission including a beam failure recovery MAC CE or a truncated beam failure recovery MAC CE of beam failure information of a cell, the MAC entity of the terminal equipment cancels all beam failure recovery triggered for all TRPs included in the cell.

In some embodiments, the terminal equipment triggers a scheduling request (SR) for the TRP-specific beam failure recovery or the TRP-specific beam failure, for a TRP that has triggered a BFR and has not been cancelled.

In some embodiments, the scheduling request configures a SR ID or a set of SR IDs.

In some embodiments, the configuration value of the TRP-specific beam failure recovery SR ID is the same as the configuration value of the cell-specific beam failure recovery SR ID, or the configuration value of the TRP-specific beam failure recovery SR ID is different from the configuration value of the cell-specific beam failure recovery SR ID.

In some embodiments, the configuration values of the TRP-specific beam failure recovery SR ID and the control resource pool index are the same as the configuration value of the cell-specific beam failure recovery SR ID, or the configuration values of the TRP-specific beam failure recovery SR ID and the control resource pool index are different from the configuration value of the cell-specific beam failure recovery SR ID.

In some embodiments, when an MAC entity of a terminal equipment has a pending SR for a TRP-specific BFR, and for an SR transmission occasion, the MAC entity has one or more PUCCH resources overlapping with PUCCH resources of the TRP-specific BFR, the MAC entity determines (deems) that the PUCCH resources of the TRP-specific BFR are valid; or When an MAC entity of a terminal equipment has a pending SR for a secondary cell/TRP-specific BFR, and for an SR transmission occasion, the MAC entity has one or more PUCCH resources overlapping with PUCCH resources of the secondary cell/TRP-specific BFR, the MAC entity determines (deems) that the PUCCH resources of the secondary cell/TRP-specific BFR are valid.

In some embodiments, in the case where the terminal equipment transmits an MAC PDU and the MAC PDU includes a beam failure recovery MAC CE or a truncated beam failure recovery MAC CE, the beam failure recovery MAC CE or the truncated beam failure recovery MAC CE includes beam failure information of a cell, the MAC entity of the terminal equipment cancels the pending SR triggered for the BFR of the TRP included in the cell and stops the respective prohibiting timer;

or, in the case where the terminal equipment transmits an MAC PDU, and the MAC PDU includes an MAC CE that includes beam failure information for a TRP, the MAC entity of the terminal equipment cancels the pending SR triggered for the BFR of the TRP and stops the respective prohibiting timer;

or once a secondary cell is deactivated, the MAC entity of the terminal equipment cancels the pending SR triggered for the BFR of the TRP included in the secondary cell;

or the MAC entity of the terminal equipment cancels the triggered pending SR if all TRP-specific BFRs of the triggered SR are cancelled;

or upon SR resource reconfiguration, the MAC entity of the terminal equipment cancels the pending SR.

In some embodiments, in the case where an MAC PDU performs transmission using an uplink grant except an uplink grant provided by random access response (RAR) or an uplink grant determined from the transmission of the message A payload (MSGA payload), and the MAC PDU includes an MAC CE including beam failure information of a TRP, the MAC entity of the terminal equipment stops the ongoing random access procedure due to the pending SR for the BFR of the TRP.

In some embodiments, the MAC entity of the terminal equipment determines whether the beam failure instance indication is cell specific or cell level; and in the case where the beam failure instance indication is not cell specific or cell level, starts or restarts a transmission reception point (TRP)-specific beam failure detection timer.

In some embodiments, the MAC entity of the terminal equipment determines whether the beam failure instance indication is TRP specific or TRP level; and in the case where the beam failure instance indication is TRP specific or TRP level, starts or restarts the transmission reception point (TRP)-specific beam failure detection timer.

In some embodiments, in the case where the beam failure instance indicates whether it is cell specific or cell level, or not TRP specific or TRP level, a cell-specific beam failure detection timer is started or restarted;

a cell-specific beam failure indication count is incremented by 1; and in a case where the cell-specific beam failure indication count is greater than or equal to the cell-specific beam failure instance maximum count, it is determined that a beam failure of the cell is detected or a beam failure recovery of the cell is triggered or a beam failure indication of the cell is triggered.

In some embodiments, the cell-specific beam failure indication count is reset or the cell-specific beam failure indication count is set to 0 in the case where the TRP-specific beam failure detection timer has expired.

The above embodiments merely exemplify the embodiments of the present application, but the present application is not limited thereto, and appropriate modifications may be made on the basis of the above embodiments. For example, each of the above embodiments may be used alone or in combination with one or more of the above embodiments.

It should be noted that only the components or modules related to the present application have been described above, but the present application is not limited thereto. The apparatus 1200 for detecting beam failure may further include other components or modules, and related art may be referred to for details of these components or modules.

In addition, for the sake of simplicity, FIG. 12 exemplarily shows only the connection relationship or signal trend between the various components or modules, however, it should be clear to a person skilled in the art that various related techniques such as bus connection may be used. The various components or modules described above may be implemented by hardware facilities such as a processor, a memory, a transmitter, a receiver, etc.; implementation of the present application is not limited thereto.

It can be known from the above embodiments, the MAC entity of the terminal equipment receives a beam failure instance indication, increments a transmission reception point (TRP)-specific beam failure indication count by 1, and in a case where the TRP-specific beam failure indication count is greater than or equal to a TRP-specific beam failure instance maximum count, determines that a beam failure occurs in a transmission reception point or beam failure recovery (BFR) of the transmission reception point is triggered or a beam failure indication of the transmission reception point is triggered. Thus, not only beam failure detection at the TRP level can be triggered when only part of the beams fails, but also beam failure detection at the cell level or the TRP level can be distinguished, thereby avoiding resource waste.

Embodiments of the Fifth Aspect

An embodiment of the present application further provides a communication system, which can refer to FIG. 1, and the same content as the embodiments of the first to fourth aspects will not be described in detail.

In some embodiments, the communication system may include:

a terminal equipment, configured to receive a beam failure instance indication by a medium access control (MAC) entity, increment a transmission reception point (TRP)-specific beam failure indication count by 1, and in a case where the TRP-specific beam failure indication count is greater than or equal to a TRP-specific beam failure instance maximum count, determine that a beam failure occurs in a transmission reception point or beam failure recovery (BFR) of the transmission reception point is triggered or a beam failure indication of the transmission reception point is triggered; and a network device which receives a beam failure recovery MAC CE or a beam failure MAC CE.

An embodiment of the present application further provides a network device, which may be, for example, a base station, but the present application is not limited thereto, and may also be other network devices.

Figure 13:
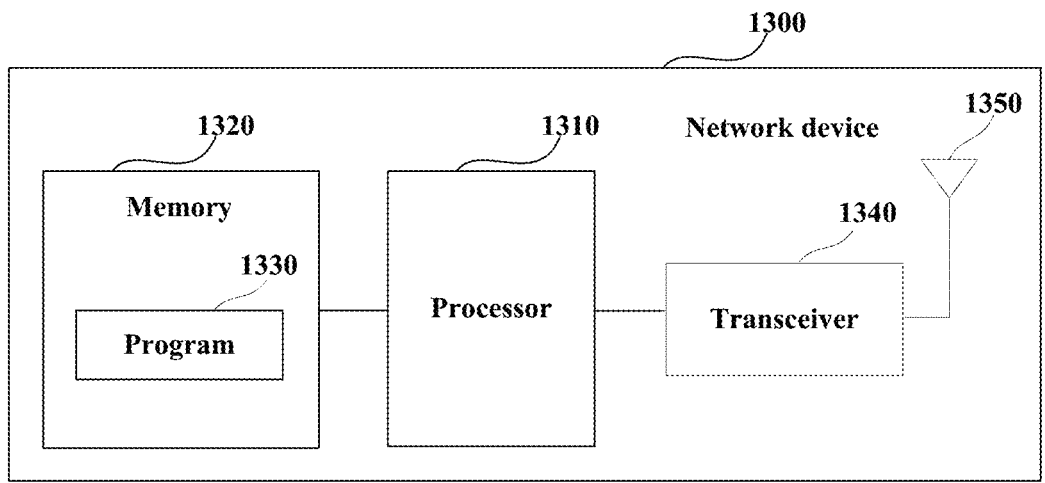
FIG. 13 is a schematic diagram of a network device according to an embodiment of the present application.

FIG. 13 is a configuration diagram of a network device according to an embodiment of the present application. As shown in FIG. 13, the network device 1300 may include a processor 1300 (such as a central processing unit (CPU)) and a memory 1320; the memory 1320 is coupled to the processor 1310. The memory 1320 can store various data; a program 1330 for information processing is also stored and the program 1330 is executed under the control of the processor 1310.

In addition, as shown in FIG. 13, the network device 1300 may further include a transceiver 1340 and an antenna 1350, etc.; the functions of the above-mentioned components are similar to those of the relevant art, and will not be described again here. It is worth noting that the network device 1300 is not necessarily required to include all of the components shown in FIG. 13; in addition, the network device 1300 may further include components not shown in FIG. 13, with reference to the relevant art.

An embodiment of the present application further provides a terminal device, but the present application is not limited thereto, and may also be other devices.

Figure 14:
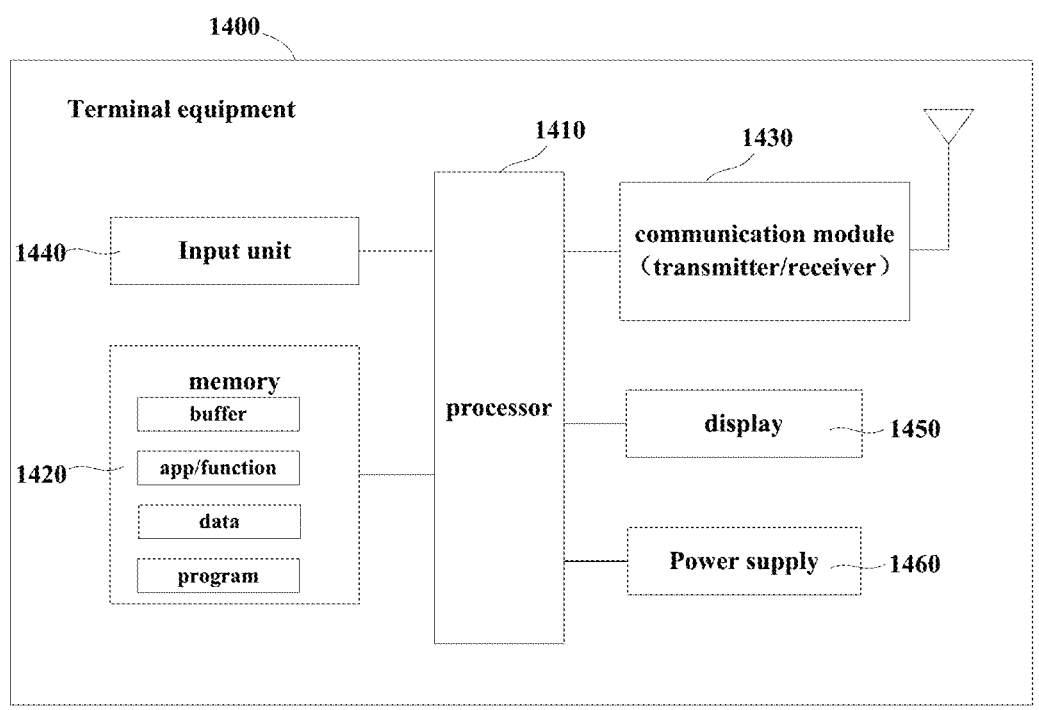
FIG. 14 is a schematic diagram of a terminal device according to an embodiment of the present application.

FIG. 14 is a schematic diagram of a terminal device according to an embodiment of the present application. As shown in FIG. 14, the terminal device 1400 may include a processor 1410 and a memory 1420; the memory 1420 stores data and program and is coupled to the processor 1410. It is worth noting that this figure is exemplary; other types of structures may also be used in addition to or instead of the structure to implement telecommunications functions or other functions.

For example, the processor 1410 may be configured to execute a program to implement the method for detecting beam failure as described in the embodiment of the first aspect. For example, the processor 1410 may be configured to perform the following controls: receiving a beam failure instance indication by a medium access control (MAC) entity; incrementing a transmission reception point (TRP)-specific beam failure indication count by 1; and in a case where the TRP-specific beam failure indication count is greater than or equal to a TRP-specific beam failure instance maximum count, determining that a beam failure occurs in a transmission reception point or beam failure recovery (BFR) of the transmission reception point is triggered or a beam failure indication of the transmission reception point is triggered.

For another example, the processor 1410 may be configured to execute a program to implement the method for detecting beam failure as described in the embodiment of the second aspect. For example, the processor 1410 may be configured to perform the following controls: receiving a beam failure instance indication by a medium access control (MAC) entity; determining whether the beam failure instance indication is TRP specific or TRP level; incrementing 1 to the TRP-specific beam failure indication count in the case where the beam failure instance indication is TRP specific or TRP level; and in a case where the TRP-specific beam failure indication count is greater than or equal to a maximum count of a TRP-specific beam failure instance, determining that a beam failure occurs in a transmission reception point or beam failure recovery (BFR) of the transmission reception point is triggered or a beam failure indication of the transmission reception point is triggered.

For example, the processor 1410 may be configured to execute a program to implement the method for detecting beam failure as described in the embodiment of the third aspect. For example, the processor 1410 may be configured to perform the following controls: detecting, by a medium access control (MAC) entity, that a beam failure occurs at a transmission reception point or in a cell or that the beam failure recovery (BFR) at the transmission reception point or in the cell is triggered or that beam failure indication of the transmission reception point or the cell is triggered; and instructing, by the MAC entity, the multiplexing and assembly entity to generate a beam failure recovery MAC CE or a beam failure MAC CE.

As shown in FIG. 14, the terminal device 1400 may further include a communication module 1430, an input unit 1440, a display 1450, and a power supply 1460. The functions of the above-mentioned components are similar to those of the relevant art, and will not be described again here. It is worth noting that the terminal device 1400 is not necessarily required to include all of the components shown in FIG. 14, and the above components are not necessary; in addition, the terminal device 1400 may further include components not shown in FIG. 14, with reference to the relevant art.

Embodiments of the present application further provide a computer program, wherein when the program is executed in a terminal device, the program causes the terminal device to execute the method for detecting beam failure as described in the embodiments of the first to third aspects.

Embodiments of the present application further provide a storage medium in which a computer program is stored, wherein the computer program causes the terminal device to execute the method for detecting beam failure as described in the embodiments of the first to third aspects.

The above apparatus and method of the present application may be implemented by hardware, or may be implemented by hardware in combination with software. The present application relates to a computer-readable program that, when executed by a logic component, enables the logic component to implement the apparatus or constituent components described above, or enables the logic component to implement the various methods or steps described above. The present application also relates to a storage medium for storing the above program, such as a hard disk, a magnetic disk, an optical disk, a DVD, a flash memory, etc.

The method/apparatus described in connection with embodiments of the present application may be embodied directly in hardware, a software module executed by a processor, or a combination of both. For example, one or more of the functional blocks and/or one or more combinations of the functional blocks shown in the drawings may correspond to each software module or each hardware module of a computer program flow. These software modules may correspond to the respective steps shown in the drawings. The hardware modules may be implemented, for example, by solidifying the software modules using a field programmable gate array (FPGA).

A software module may be located in an RAM memory, a flash memory, an ROM memory, an EPROM memory, an EEPROM memory, a register, a hard disk, a removable disk, a CD-ROM, or any other form of storage medium known in the art. A storage medium may be coupled to the processor to enable the processor to read information from and write information to the storage medium, or the storage medium may be an integral part of the processor. The processor and the storage medium may reside in an ASIC. The software module may be stored in a memory of the mobile terminal or in a memory card insertable into the mobile terminal. For example, if the device (such as a mobile terminal) employs a large-capacity MEGA-SIM card or a large-capacity flash memory device, the software module can be stored in the MEGA-SIM card or the large-capacity flash memory device.

One or more of the functional blocks and/or one or more combinations of the functional blocks depicted in the accompanying drawings may be implemented as a general purpose processor, a digital signal processor (DSP), an application specific integrated circuit (ASIC), a field programmable gate array (FPGA) or other programmable logic devices, a discrete gate or a transistor logic device, a discrete hardware component, or any suitable combination thereof designed to perform the functions described in the present application. One or more of the functional blocks and/or one or more combinations of the functional blocks depicted in the accompanying drawings may also be implemented as combination of computing devices, e.g., combination of a DSP and a microprocessor, a plurality of microprocessors, one or more microprocessors in communication with the DSP, or any other such configuration.

The present application is described in combination with specific embodiments hereinabove, but a person skilled in the art should know clearly that the description is exemplary, but not limitation to the protection scope of the present application. A person skilled in the art can make various variations and modifications to the present application according to spirit and principle of the application, and these variations and modifications should also be within the scope of the present application.

What is claimed is:

1. An apparatus for detecting beam failure for a beam failure detection reference signal (BFD-RS) set of a serving cell, comprising:
   a receiver configured to receive a beam failure instance indication by a medium access control entity; and
   processor circuitry configured to:
      increment a beam failure indication count of a beam failure detection reference signal set by 1; and
      configure the serving cell with two BFD-RS sets including the BFD-RS set;
      in a case where the beam failure indication count of the beam failure detection reference signal set is greater than or equal to a beam failure instance maximum count for beam failure detection reference signal set, trigger beam failure recovery for the beam failure detection reference signal set of the serving cell,
   wherein the medium access control entity triggers a scheduling request used for beam failure recovery of beam failure detection reference signal set for which beam failure recovery is triggered and not cancelled,
   wherein the scheduling request configures a scheduling request ID or a group of scheduling request IDs, and
   wherein when the medium access control entity has a pending scheduling request for beam failure recovery of beam failure detection reference signal set, the medium access control entity has one or more physical uplink control channel resources overlapping with physical uplink control channel resources of beam failure recovery of beam failure detection reference signal set for a scheduling request transmission occasion, the medium access control entity determines that the physical uplink control channel resources of the beam failure recovery of beam failure detection reference signal set are valid.

2. The apparatus according to claim 1, wherein the processor circuitry is further configured to start or restart a beam failure detection timer of the beam failure detection reference signal set in a case where the medium access control entity receives a beam failure instance indication; and in a case where the beam failure detection timer of the beam failure detection reference signal set expires, set the beam failure indication count of the beam failure detection reference signal set to be 0.

3. The apparatus according to claim 1, wherein the medium access control entity instructs a multiplexing and assembling entity to generate a transmission reception point-specific beam failure recovery medium access control control element.

4. The apparatus according to claim 3, wherein the medium access control entity determines whether evaluation of one or more candidate beams is completed when the one or more candidate beams are configured.

5. The apparatus according to claim 3, wherein if the beam failure recovery procedure determines that at least one beam failure recovery has been triggered and is not cancelled, or a beam failure is detected, or at least one beam failure indication is triggered and is not cancelled, and if a candidate beam list is configured and evaluation of at least one reference signal in the candidate beam list has been completed, the medium access control entity instructs the multiplexing and assembling entity to generate the transmission reception point-specific beam failure recovery medium access control control element or to generate a transmission reception point-specific beam failure medium access control control element.

6. The apparatus according to claim 3, wherein if the beam failure recovery procedure determines that at least one beam failure recovery has been triggered and is not cancelled, or a beam failure is detected, or at least one beam failure indication is triggered and is not cancelled, and if a candidate beam list is not configured, the medium access control entity does not determine whether evaluation of candidate beams is completed.

7. The apparatus according to claim 1, wherein in a case where at least one beam failure recovery has been triggered, if candidate beams are not configured, the medium access control entity determines that evaluation of candidate beams is completed, and/or, when a physical layer receives a request from a higher layer, if candidate beams are not configured, the physical layer determines that evaluation of candidate beams is completed.

8. The apparatus according to claim 1, wherein for each serving cell configured for beam failure detection, the medium access control entity performs beam failure detection to trigger the beam failure recovery for the beam failure detection reference signal set.

9. The apparatus according to claim 1, wherein all serving cells in the medium access control entity are not configured with cell-specific beam failure detection, or a special cell in the medium access control entity of a terminal equipment is not configured with cell-specific beam failure detection; and in a case where transmission reception point-specific beam failures are detected in multiple transmission reception points or transmission reception point-specific beam failure recovery is triggered in the multiple transmission reception points, the medium access control entity initiates a random access procedure in the special cell.

10. The apparatus according to claim 9, wherein the multiple transmission reception points comprise: all transmission reception points configured with transmission reception point-specific beam failure detection of all serving cells in a medium access control entity, or all transmission reception points configured with transmission reception point-specific beam failure detection of a special cell in a medium access control entity.

11. The apparatus according to claim 1, wherein the medium access control entity determines whether a transmission reception point belongs to a secondary cell, and in a case where the transmission reception point belongs to a secondary cell, determines that a beam failure occurs in the transmission reception point or beam failure recovery of the transmission reception point is triggered or a beam failure indication of the transmission reception point is triggered.

12. The apparatus according to claim 11, wherein the medium access control entity determines whether beam failure recovery of all transmission reception points configured with transmission reception point-specific beam failure detection is triggered, and in a case where beam failure recovery of all transmission reception points configured with transmission reception point-specific beam failure detection is triggered, initiates a random access procedure in a special cell.

13. The apparatus according to claim 1, wherein the medium access control entity performs one or any combination of the following operations:

in a case where a medium access control protocol data unit is transmitted and the medium access control protocol data unit includes a transmission reception point-specific beam failure recovery medium access control control element, cancelling all beam failure recovery triggered for beam failure detection reference signal set; or if a physical downlink control channel addressed to a Cell Radio Network Temporary Identifier (C-RNTI) indicating an uplink grant for a new transmission is received for an Hybrid Automatic Repeat Request (HARQ) process used for a transmission reception point-specific beam failure recovery medium access control control element, cancelling all beam failure recovery triggered for beam failure detection reference signal set.

14. The apparatus according to claim 1, wherein a configuration value of a transmission reception point-specific beam failure recovery scheduling request ID is identical to a configuration value of cell-specific beam failure recovery scheduling request ID, or a configuration value of the transmission reception point-specific beam failure recovery scheduling request ID is different from a configuration value of cell-specific beam failure recovery scheduling request ID; or a configuration value of the transmission reception point-specific beam failure recovery scheduling request ID and a control resource pool index is identical to a configuration value of cell-specific beam failure recovery scheduling request ID, or a configuration value of the transmission reception point-specific beam failure recovery scheduling request ID and a control resource pool index is different from a configuration value of cell-specific beam failure recovery scheduling request ID.

15. The apparatus according to claim 1, wherein, in a case where a medium access control protocol data unit is transmitted, the medium access control protocol data unit includes a medium access control control element which contains beam failure recovery information for beam failure detection reference signal set, the medium access control entity cancels a pending scheduling request triggered for beam failure recovery of beam failure detection reference signal set and stops respective prohibit timers; or once a secondary cell is deactivated, the medium access control entity cancels a pending scheduling request triggered by beam failure recovery for beam failure detection reference signal set of the secondary cell.

16. The apparatus according to claim 1, wherein, in a case where a medium access control protocol data unit is transmitted by using an uplink grant other than an uplink grant provided by a random access response or an uplink grant determined according to transmission of a message A payload, and the medium access control protocol data unit includes a medium access control control element which contains beam failure recovery information of beam failure detection reference signal set, the medium access control entity stops an ongoing random access procedure due to a pending SR for beam failure recovery of beam failure detection reference signal set.

17. A method for detecting beam failure for a beam failure detection reference signal (BFD-RS) set of a serving cell, comprising:

receiving a beam failure instance indication by a medium access control entity of a terminal equipment;

incrementing a beam failure indication count of a beam failure detection reference signal set by 1; and configure the serving cell with two BFD-RS sets including the BFD-RS set;

in a case where the beam failure indication count of the beam failure detection reference signal set is greater than or equal to a beam failure instance maximum count for beam failure detection reference signal set, triggering beam failure recovery for the beam failure detection reference signal set of the serving cell, wherein the medium access control entity triggers a scheduling request used for beam failure recovery of beam failure detection reference signal set for which beam failure recovery is triggered and not cancelled, wherein the scheduling request configures a scheduling request ID or a group of scheduling request IDs, and wherein when the medium access control entity has a pending scheduling request for beam failure recovery of beam failure detection reference signal set, the medium access control entity has one or more physical uplink control channel resources overlapping with physical uplink control channel resources of beam failure recovery of beam failure detection reference signal set for a scheduling request transmission occasion, the medium access control entity determines that the physical uplink control channel resources of the beam failure recovery of beam failure detection reference signal set are valid.

18. A communication system, comprising:

a terminal equipment, configured to:

receive a beam failure instance indication by a medium access control entity, increment a beam failure indication count of a beam failure detection reference signal set (BFD-RS) by 1, and configure a serving cell with two BFD-RS sets including the BFD-RS set;

in a case where the beam failure indication count of the beam failure detection reference signal set is greater than or equal to a beam failure instance maximum count for beam failure detection reference signal set, trigger beam failure recovery for beam failure detection reference signal set of the serving cell, wherein the medium access control entity triggers a scheduling request used for beam failure recovery of beam failure detection reference signal set for which beam failure recovery is triggered and not cancelled, wherein the scheduling request configures a scheduling request ID or a group of scheduling request IDs, and wherein when the medium access control entity has a pending scheduling request for beam failure recovery of beam failure detection reference signal set, the medium access control entity has one or more physical uplink control channel resources overlapping with physical uplink control channel resources of beam failure recovery of beam failure detection reference signal set for a scheduling request transmission occasion, the medium access control entity determines that the physical uplink control channel resources of the beam failure recovery of beam failure detection reference signal set are valid.

\* \* \* \* \*